US009284135B2

(12) United States Patent
Sveum

(10) Patent No.: US 9,284,135 B2
(45) Date of Patent: Mar. 15, 2016

(54) SAFETY SYSTEMS FOR VERTICALLY STORING DOCK LEVELERS

(71) Applicant: Matthew Sveum, Wauwatosa, WI (US)

(72) Inventor: Matthew Sveum, Wauwatosa, WI (US)

(73) Assignee: RITE-HITE HOLDING CORPORATION, Milwaukee, WI (US)

( * ) Notice: Subject to any disclaimer, the term of this patent is extended or adjusted under 35 U.S.C. 154(b) by 0 days.

(21) Appl. No.: 14/204,987

(22) Filed: Mar. 11, 2014

(65) Prior Publication Data

US 2015/0047133 A1    Feb. 19, 2015

Related U.S. Application Data

(63) Continuation-in-part of application No. 13/965,730, filed on Aug. 13, 2013.

(51) Int. Cl.
*B65G 69/28* (2006.01)

(52) U.S. Cl.
CPC ........ *B65G 69/2882* (2013.01); *B65G 69/2811* (2013.01); *B65G 2203/041* (2013.01); *B65G 2203/044* (2013.01)

(58) Field of Classification Search
USPC .................................................. 14/71.1, 71.3
IPC .................... B65G 69/2811,69/2882
See application file for complete search history.

(56) References Cited

U.S. PATENT DOCUMENTS

| 4,977,635 | A | 12/1990 | Alexander |
| 5,299,386 | A | 4/1994 | Naegelli et al. |
| 5,396,676 | A | 3/1995 | Alexander et al. |
| 5,586,355 | A | 12/1996 | Metz et al. |
| 6,502,268 | B2 | 1/2003 | Ashelin et al. |
| 7,045,764 | B2 | 5/2006 | Beggs et al. |
| 7,380,375 | B2 | 6/2008 | Maly |
| 7,954,606 | B2 * | 6/2011 | Tinone et al. .................. 187/384 |
| 8,424,254 | B2 | 4/2013 | Ballester |
| 8,547,234 | B2 | 10/2013 | Maly et al. |
| 8,590,087 | B2 | 11/2013 | Swessel et al. |
| 8,926,254 | B2 * | 1/2015 | Pocobello et al. ............ 414/537 |
| 2004/0075046 | A1 | 4/2004 | Beggs et al. |
| 2008/0141470 | A1 | 6/2008 | Belongia |
| 2008/0223667 | A1 | 9/2008 | Tinone et al. |
| 2009/0274542 | A1 | 11/2009 | Pocobello et al. |
| 2010/0146719 | A1 | 6/2010 | Swessel et al. |

(Continued)

FOREIGN PATENT DOCUMENTS

WO    2009073001    6/2009

OTHER PUBLICATIONS

United States Patent and Trademark Office, "Non-Final Office Action," issued in connection with U.S. Appl. No. 13/965,730, mailed on Dec. 19, 2013, 10 pages.

(Continued)

*Primary Examiner* — Gary Hartmann
(74) *Attorney, Agent, or Firm* — Hanley, Flight & Zimmerman, LLC

(57) ABSTRACT

Dock leveler safety systems for vertically storing dock levelers are disclosed herein. An example method for sensing a body present within an area of a pit at a loading dock includes monitoring the area of the pit via a sensor system by capturing an image of the area, comparing the captured image to a reference image to determine whether a body is present in the area of the pit, and commanding a deck of a dock leveler to not lower relative to the pit if the body is present.

14 Claims, 18 Drawing Sheets

(56) References Cited

U.S. PATENT DOCUMENTS

2012/0025964 A1 2/2012 Beggs et al.
2015/0047132 A1* 2/2015 Sveum ............... B65G 69/2882
14/71.1

OTHER PUBLICATIONS

United States Patent and Trademark Office, "Final Office Action," issued in connection with U.S. Appl. No. 13/965,730, mailed on Apr. 7, 2014, 7 pages.

United States Patent and Trademark Office, "Non-Final Office Action," issued in connection with U.S. Appl. No. 13/965,730, Jul. 18, 2014, 6 pages.

International Searching Authority, "The Written Opinion of the International Searching Authority," issued in connection with corresponding International Patent Application No. PCT/US2014/050716, mailed Dec. 11, 2014 (7 pages).

International Searching Authority, "The International Search Report," issued in connection with corresponding International Patent Application No. PCT/US2014/050716, mailed Dec. 11, 2014 (6 pages).

International Searching Authority, "The Written Opinion of the International Searching Authority," issued in connection with corresponding International Patent Application No. PCT/US2014/050721, mailed Dec. 11, 2014 (8 pages).

International Searching Authority, "The International Search Report," issued in connection with corresponding International Patent Application No. PCT/US2014/050721, mailed Dec. 11, 2014 (6 pages).

United States Patent and Trademark Office, "Advisory Action," issued in connection with U.S. Appl. No. 13/965,730, Jan. 7, 2015, 3 pages.

United States Patent and Trademark Office, "Final Office Action," issued in connection with U.S. Appl. No. 13/965,730, Oct. 29, 2014, 6 pages.

United States Patent and Trademark Office, "Examiner's Answer," issued in connection with U.S. Appl. No. 13/965,730, Aug. 26, 2015, 11 pages.

* cited by examiner

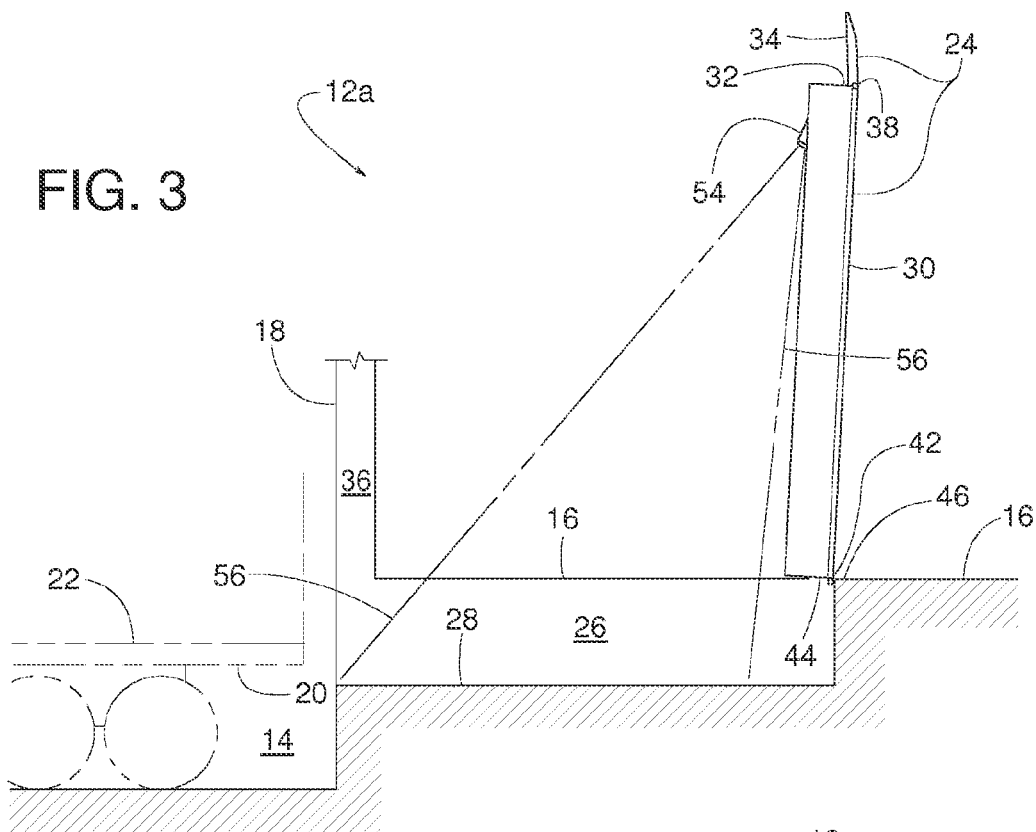
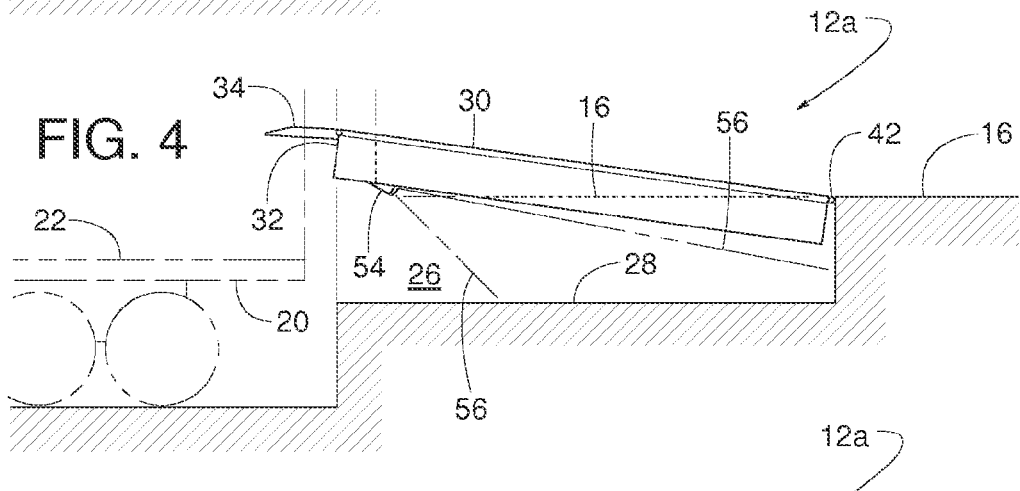
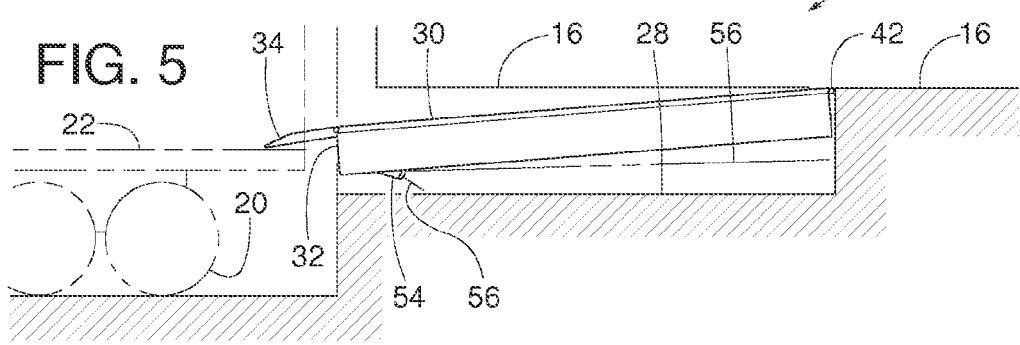

SAFETY SYSTEMS FOR VERTICALLY STORING DOCK LEVELERS

CROSS REFERENCE TO RELATED APPLICATION

This patent arises from a continuation-in-part of U.S. patent application Ser. No. 13/965,730, filed Aug. 13, 2013, which is hereby incorporated herein by reference in its entirety.

FIELD OF THE DISCLOSURE

The present disclosure relates generally to vertically storing dock levelers and, more specifically, to safety systems for vertically storing dock levelers.

BACKGROUND

A typical loading dock of a building includes an exterior doorway with an elevated platform for loading and unloading vehicles, such as trucks and trailers. To compensate for height differences between the loading dock platform and an adjacent bed of a truck or trailer, many loading docks have a dock leveler. A typical dock leveler includes a deck or ramp that is pivotally hinged along a rear edge to vary the height of a front edge of the deck. An extension plate or lip extends outward from the front edge of the deck to span a gap between a rear of a truck bed and the front edge of the deck. This allows personnel and material handling equipment to readily move on and off the vehicle during loading and unloading operations.

The deck is usually moveable between a stored position and an operative position. Depending on the style of dock leveler, the deck may store either vertically or horizontally. Vertically storing decks are usually driven by a hydraulic cylinder. The hydraulic cylinder typically extends to raise the deck to a vertically stored position and retracts as the deck descends to an operative position. The force for lowering the deck can be provided from the hydraulic action within the cylinder and/or the weight of the deck itself. In some cases, the weight of the deck urges the deck downward while a hydraulic flow restriction associated with the cylinder provides the deck with a controlled descent.

Vertically storing dock levelers offer important benefits over horizontal levelers. They offer better access to a pit floor for cleaning, which may be required in some industries. In addition, vertically storing dock levelers facilitate an environmental seal between the outside dock door and the dock floor.

BRIEF DESCRIPTION OF THE DRAWINGS

FIG. 3 is a right side view of FIG. 1.

FIG. 4 is a side view similar to FIG. 3 but showing a deck of the example dock leveler in a lowered position.

FIG. 5 is a side view similar to FIG. 4 but showing the example deck in another lowered position.

DETAILED DESCRIPTION

Figure 1:
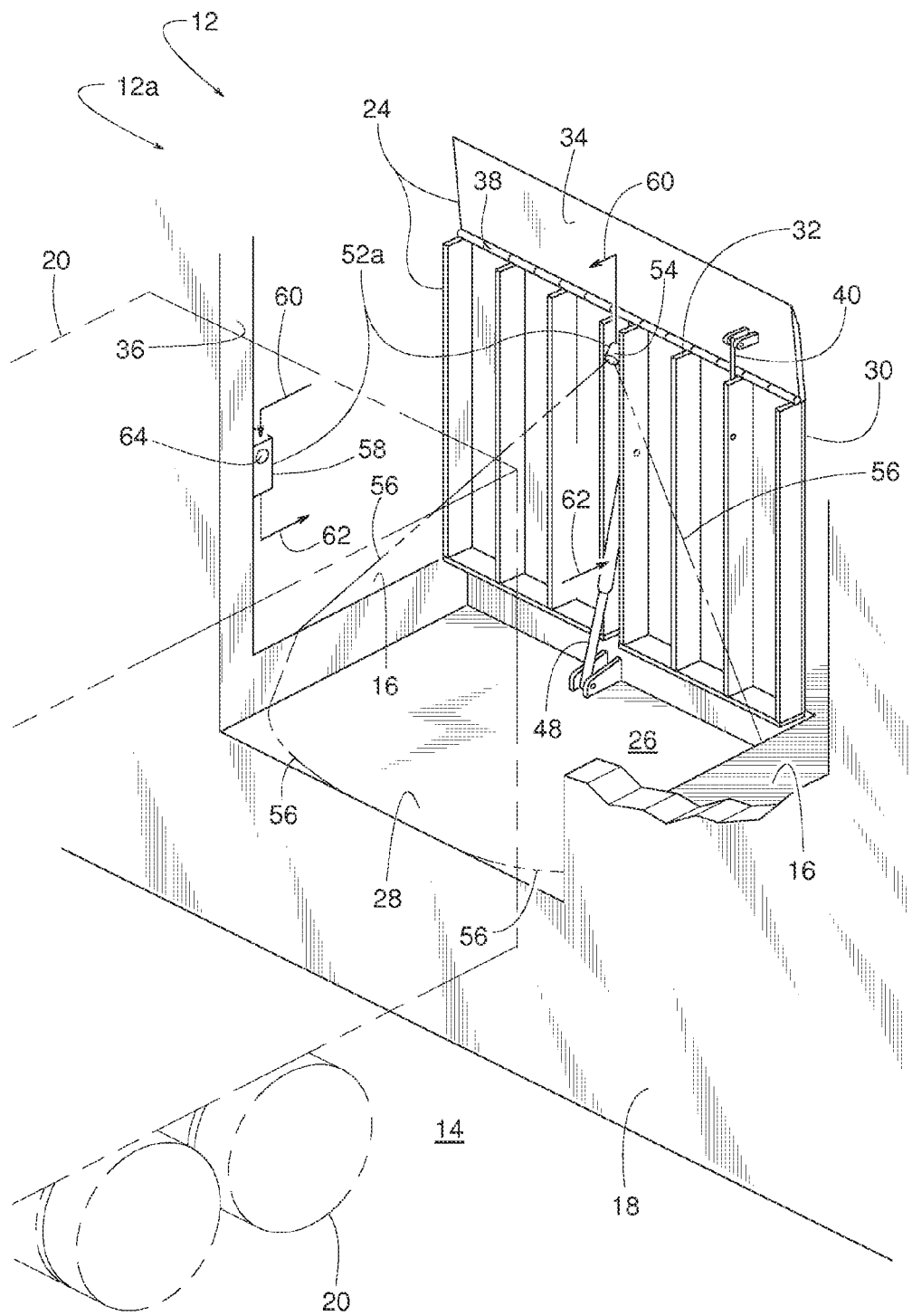
FIG. 1 is a partial cutaway perspective view of an example safety system constructed in accordance with the teachings disclosed herein and for use with a vertically storing dock leveler.

To ensure safe operation of dock levelers having a deck that pivots between an upright position and a lowered operative position, example safety systems disclosed herein determine an absence or presence of an object or individual adjacent or near a deck when the deck is to descend and/or is descending to a lowered position. In some examples, an example sensor system disclosed herein surveys an area near a pit floor rather than monitoring just an area near the deck. In this way, the deck does not have to approach an object or individual in order to determine whether an individual is present. The absence or presence of an object or individual can be determined while the deck is in an upright position and/or before engagement with the obstructing object and/or person.

FIGS. 1-16 show example dock leveler safety systems 12 (e.g., safety systems 12a-12l) which may be used at a loading dock 14 for transferring cargo between a dock platform 16 of a building or a dock wall 18 and the open rear end of a vehicle 20, such as a truck or trailer. To compensate for a height difference that might exist between the dock platform 16 and a floor 22 or a trailer bed of the vehicle 20, an example dock"

leveler 24 is installed within a pit 26, which extends from the upper surface of the dock platform 16 down to a pit floor 28. In the illustrated example, the dock leveler 24 has a deck 30 that can pivot between a generally upright stored position (e.g., as shown in FIGS. 1-3 and 6-10) and select lowered positions of various heights (e.g., as shown in FIGS. 4 and 5). The various lowered positions serve to vertically align a front edge 32 of deck 30 to the approximate height of the vehicle's floor 22. In some examples, a lip 34 extends from the deck 30 to span a gap between the deck's front edge 32 and the rear edge of the vehicle 20. When deployed, the deck 30 and the lip 34 provide a bridge or ramp across which material handling equipment and/or personnel can travel through a doorway 36 between the dock platform 16 and the vehicle 20.

In some examples, a hinge 38 pivotally connects the lip 34 to the deck 30, and a lip actuator 40 pivots the lip 34 between an extended position (as shown in FIGS. 1-10) and a pendant position (not shown) where the lip 34 lies generally perpendicular to the deck 30. Examples of the lip actuator 40 include, but are not limited to, a hydraulic cylinder, a pneumatic cylinder, a linear motor, a manual actuator, an inflatable diaphragm, a winch, a hoist, a spring, and/or various combinations thereof. In some examples, the lip 34 translates rather than pivots relative to the deck 30. In some examples, the lip 34 is stationary relative to the deck 30. In some examples, the dock leveler 24 does not include the lip 34.

Figure 2:
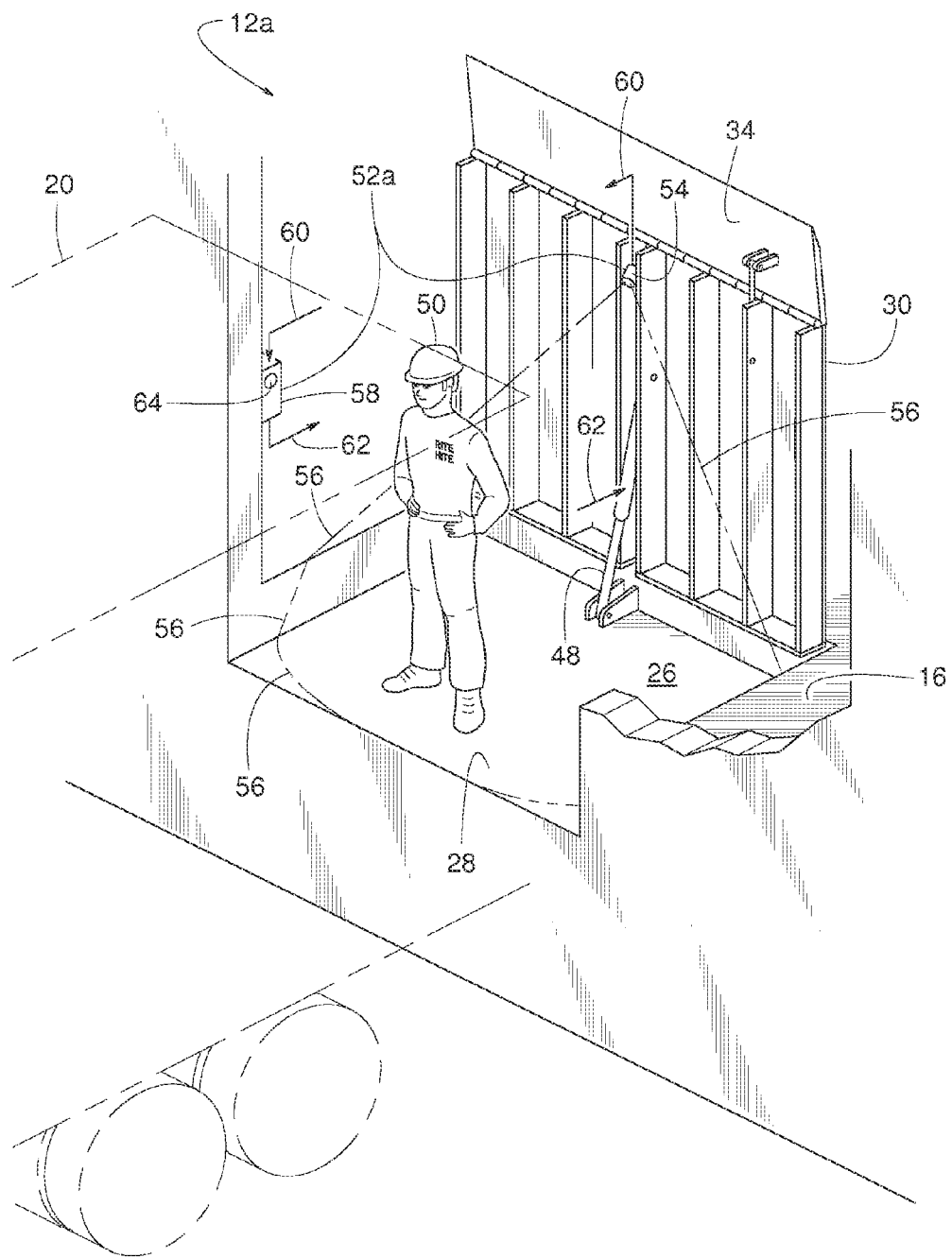
FIG. 2 is a perspective view similar to FIG. 1 but showing a person located in a pit of the example dock leveler of FIG. 1.

In the illustrated example, a rear hinge 42 (FIGS. 3-5) pivotally connects a rear edge 44 of the deck 30 to an upper edge 46 of the dock platform 16, and a deck actuator 48 pivots the deck 30 between the stored upright position and a lowered position (e.g., an operative position). Examples of the deck actuator 48 include, but are not limited to, a hydraulic cylinder, a pneumatic cylinder, a linear motor, an inflatable diaphragm, a winch, a hoist, a spring, and/or various combinations thereof. FIGS. 4 and 5 show the deck 30 being moveable over a range of operative positions, and FIGS. 1-3 show the deck 30 outside of (e.g., above) the range of the operative positions. In some lowered positions, as shown in FIG. 5, the lip 34 rests upon the vehicle's floor 22 to provide a smooth transition for material handling equipment to travel between the deck 30 and the vehicle 20.

Referring to FIG. 2, to prevent the deck 30 from accidentally lowering against a body 50 (such as a worker standing on pit floor 28) within the pit 26, the example dock leveler 24 of the illustrated example employs a safety system 12*a*. The safety system 12*a* of the illustrated example includes a sensor system 52*a* for detecting the presence and/or movement of the body 50 in the area of the pit 26. In the example illustrated in FIGS. 1-5, the sensor system 52*a* includes a sensor 54 attached to an underside of the deck 30. The sensor 54 may be implemented by any device capable of detecting the presence and/or motion of a body (e.g., the body 50) within a sensed region or area. Examples of such sensors include, but are not limited to, photoelectric eyes, proximity sensors, motion detectors for sensing moving bodies, and/or body sensors for detecting stationary bodies. Some such sensors operate under various principles including, but not limited to, ultrasonics, active and/or passive detection of infrared radiation, visible light detection, laser detection, detection of electromagnetic radiation (including sensing radio waves or sensing changes in capacitance or inductance), detection of a Doppler shift in microwaves, etc. In some examples, the sensor(s) may be a video camera with analytics (e.g., a video camera). In examples in which the sensor includes a video camera with analytics, the video camera may be located in any location within a line of sight of the sensed area or region 56. Example video cameras and methods of use that can be used to implement a sensor are described in U.S. patent application Ser. No. 14/196,858, titled "Methods and Apparatus for Video Based Process Monitoring and Control, which was filed on Mar. 4, 2014, and is hereby incorporated by reference herein in its entirety. In some examples, the video camera captures images of the sensed region or area and compares the images to a stored reference image to determine or detect a presence of a body in the sensing area.

In the illustrated example, the sensor system 52*a* monitors a sensed region 56 that projects in at least a portion of an area defined by pit 26. In some examples, as shown in FIGS. 3-5, the sensed region 56 decreases in size or area as the deck 30 descends from the stored upright position (FIG. 3) to the lowered position (e.g., the lowered positions shown in FIG. 4 or 5). In some examples, the decrease in size or area of the sensed region 56 can effectively deactivate or diminish the function of the sensor system 52*a* when the deck 30 is operating within the range of operative positions such as, for example, the positions shown in FIGS. 4 and 5. In some examples, the sensor system 52*a* includes a logic circuit or controller 58 (e.g., a semiconductor (i.e., a non-carbon) based processor, programmable logic controller, etc.) for distinguishing unexpected movement of the body 50 and normal movement of the sensor 54 relative to pit 26 as the deck 30 descends to the lowered position. All or part of the logic circuit/controller 58 and/or associated electrical enclosures (e.g., junction boxes) can be installed at any location (e.g., proximate or remote locations) relative to the dock leveler 30 and/or the sensor 54.

In response to the sensor system 52*a* detecting the body 50 moving or being present within the sensed region 56, the sensor system 52*a* generates a reaction signal 60 that the controller 58 receives as an input. Upon receiving the reaction signal 60, the controller 58 provides or generates an output 62 that commands the deck 30 to a state of restricted movement. In some examples, the state of restricted movement is a state in which the deck actuator 48 holds the deck 30 substantially stationary. In other words, the state of restricted movement is a state in which the deck actuator 48 prevents or restricts upward and/or downward movement of the deck 30. In some examples, entry into the state of restricted movement causes the output 62 to command the deck actuator 48 to drive the deck 30 to the stored upright position. In some examples, entry into the state of restricted movement causes the output 62 to prevent the deck actuator 48 from lowering the deck 30 but allows the deck actuator 48 to raise the deck 30. In other words, upward movement of the deck 30 is enabled, but downward movement of the deck 30 is generally prevented or restricted. In some examples, the reaction signal 60 also triggers the controller 58 to emit an alarm signal 64 (e.g., an audible alarm or a visual alarm).

In some examples, once the deck 30 is operating within the range of operative positions, as shown for example in FIGS. 4 and 5, the reaction signal 60 is disregarded or disabled to allow the deck 30 to function in a state of normal operation. In this manner, false signals triggered by the sensor 54 being proximate the pit floor 28 do not interfere with normal operation of the dock leveler 24.

Figure 6:
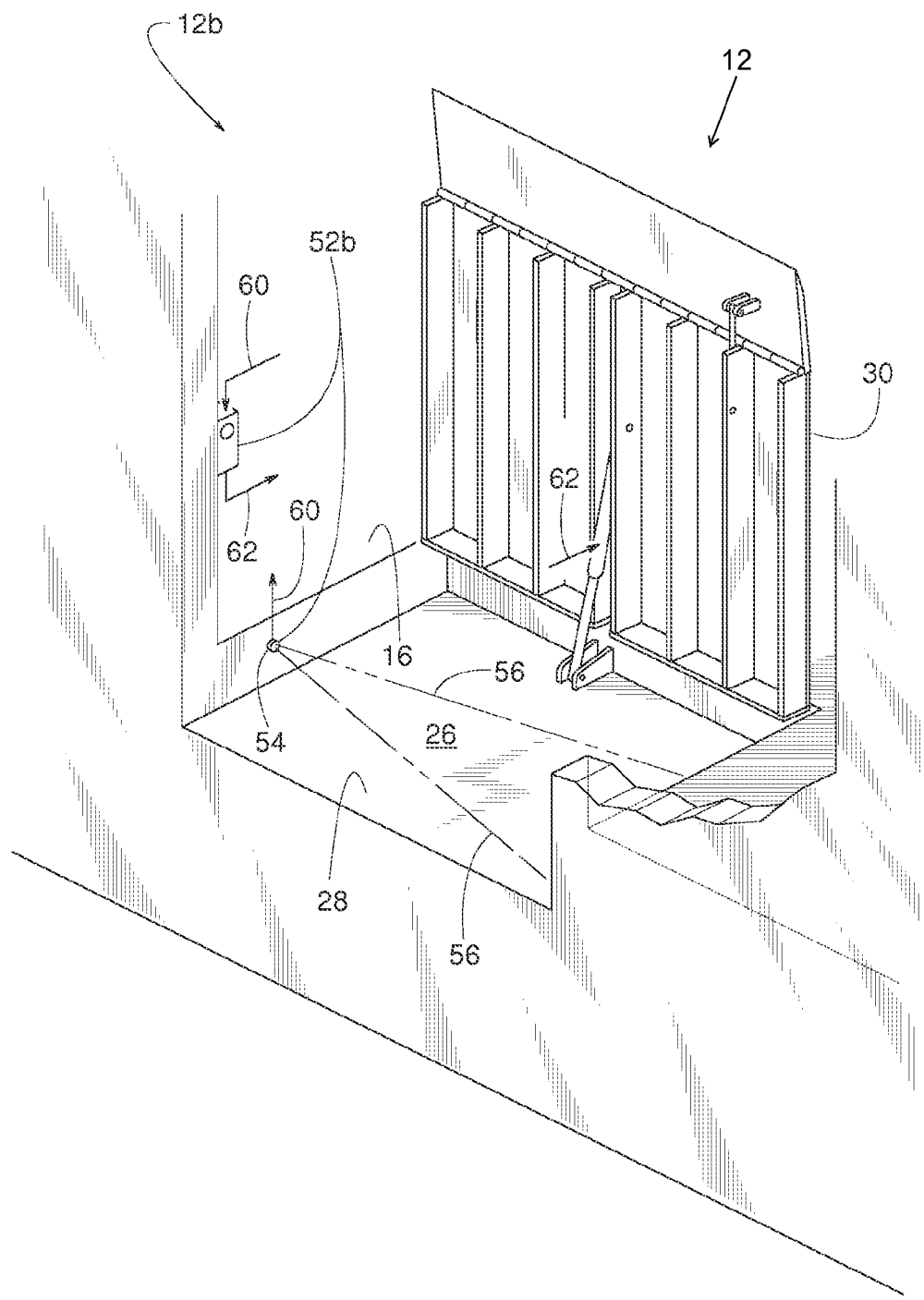
FIG. 6 is a partial cutaway perspective view of another example safety system constructed in accordance with the teachings disclosed herein.

FIG. 6 shows another example safety system 12*b* disclosed herein for monitoring and/or controlling operation of a vertically storing dock leveler. The example safety system 12*b* of FIG. 6 has a sensor system 52*b* that includes sensor 54 (e.g., a body sensor for detecting the presence of the body 50, and/or a motion detector for sensing movement of the body 50) installed at a location (e.g., fixed to a structure that is stationary relative to the dock leveler 24). The sensed region 56 of the illustrated example is in an area of the pit 26 adjacent the pit floor 28. In this example, the sensor 54 and the sensed region 56 remain substantially stationary as the deck 30 moves between the stored upright position and the lowered position. The sensor 54 provides a reaction signal 60 in response to sensing the presence or movement of the body 50 within the sensed region 56. The reaction signal 60 of the illustrated example is used in the same or similar manner as the reaction signal is used in the safety system 12a discussed above.

Figure 7:
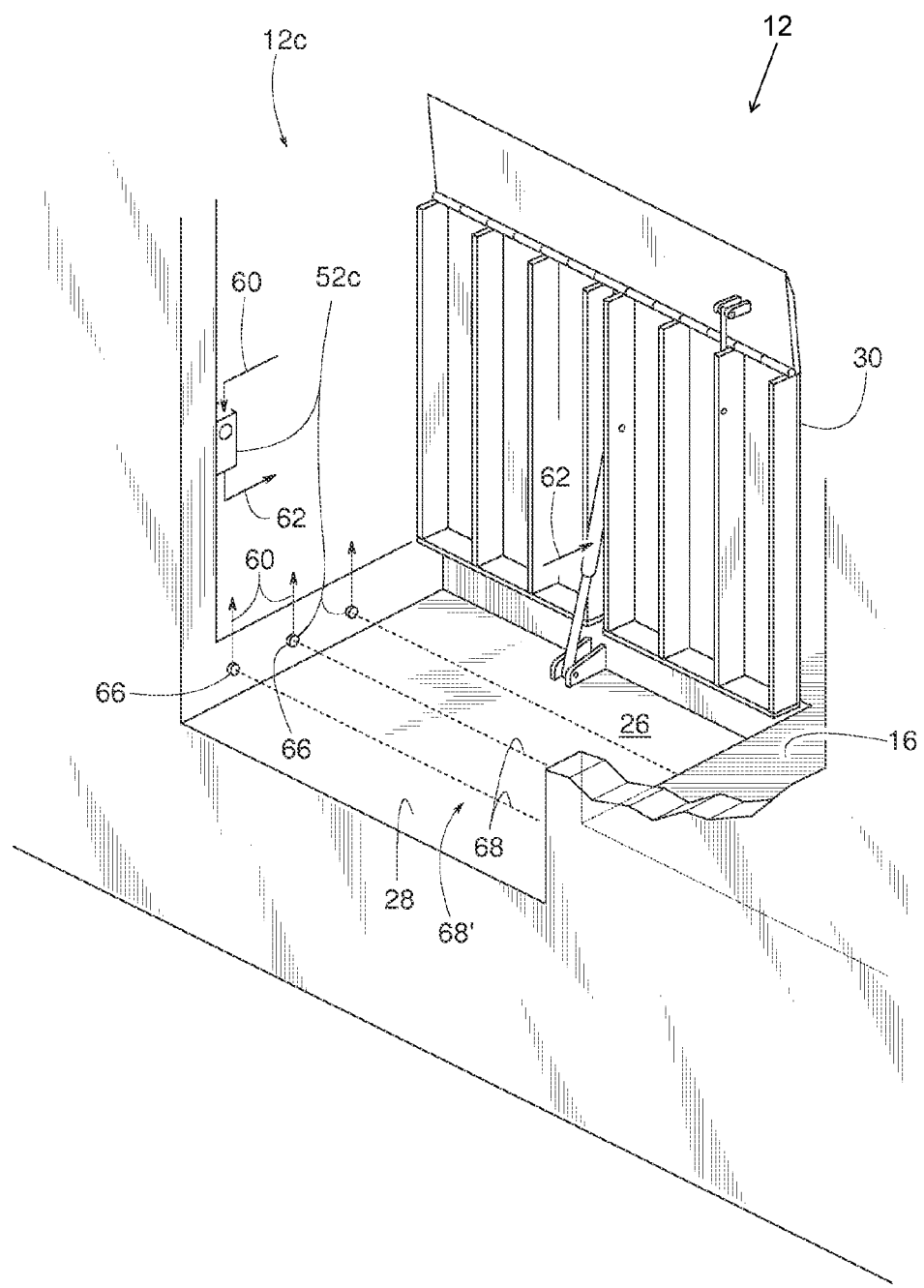
FIG. 7 is a partial cutaway perspective view of another example safety system constructed in accordance with the teachings disclosed herein.

FIG. 7 shows another example safety system 12c disclosed herein for monitoring and/or controlling operation of a vertically storing dock leveler. The example safety system 12c of FIG. 7 has a sensor system 52c that includes a plurality of sensors 66 installed at stationary locations within or near the pit 26. Each sensor 66 emits a beam 68 at least partially across the pit 26. Examples of sensors 66 include, but are not limited to, photoelectric eyes, proximity sensors, motion detectors for sensing moving bodies, and/or body sensors for detecting stationary bodies. Sensors suitable for some implementations include devices that operate under various principles including, but not limited to, ultrasonics, active and/or passive detection of infrared radiation, visible light detection, laser detection, etc. In some examples, the beam 68 is a thru-beam passing from an emitter to a receiver, directly or reflected. Each sensor 66 provides the reaction signal 60 in response to sensing the presence or movement of the body 50 within a sensed region 68' within the pit 26 and/or adjacent the pit floor 28. The reaction signal 60 of the illustrated example is used in the same or similar manner as the reaction signal is used in the safety system 12a discussed above.

Figure 8:
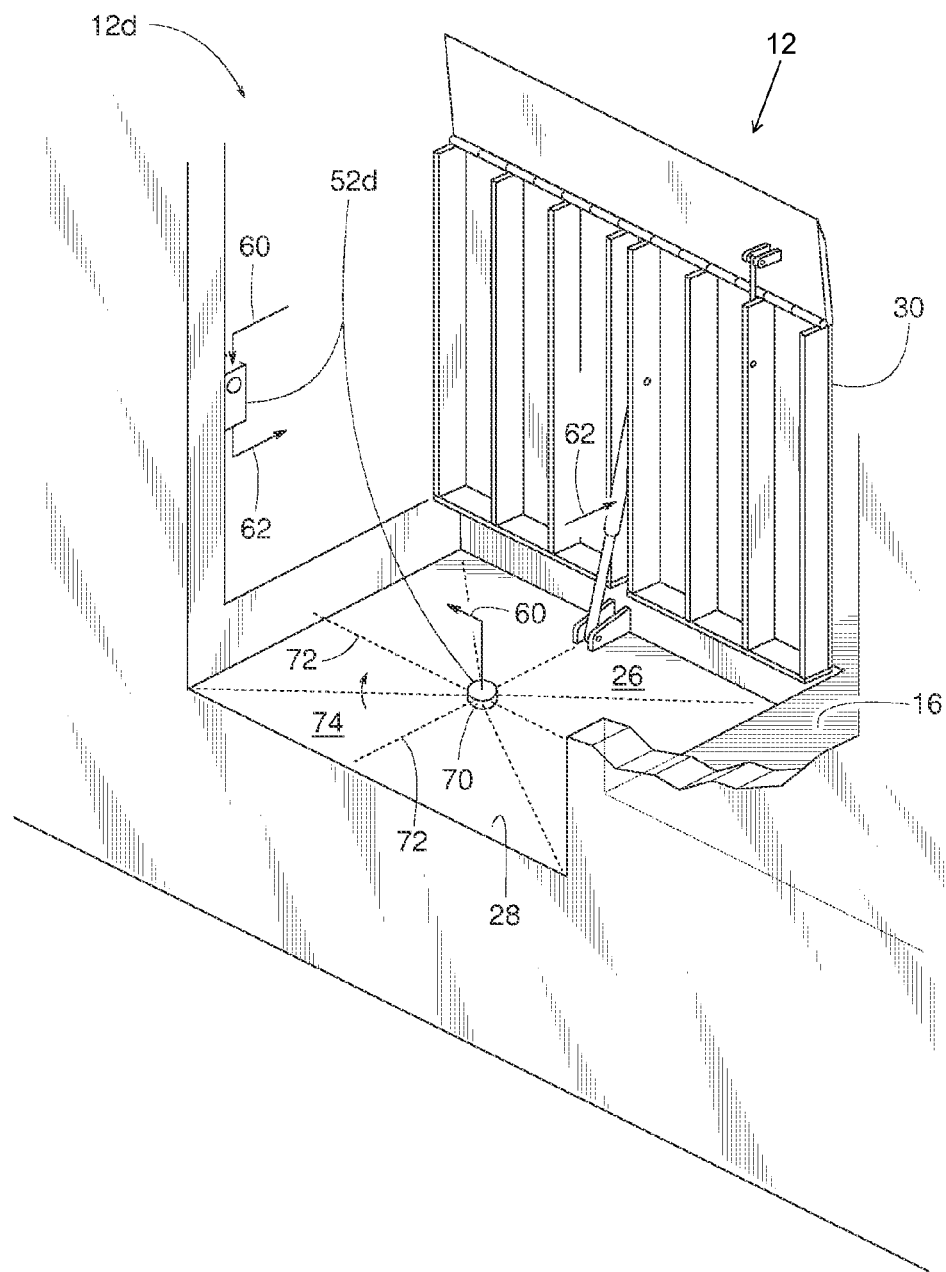
FIG. 8 is a partial cutaway perspective view of another example safety system constructed in accordance with the teachings disclosed herein.

FIG. 8 shows another safety system 12d disclosed herein for monitoring and/or controlling operation of a vertically storing dock leveler. The example safety system 12d of FIG. 8 has a sensor system 52d that includes a sensor 70 in the form of a laser scanner fixed at a location within the pit 26 so as not to move during operation. The sensor 70 emits rotating or radial beams 72 that scan or monitor a sensed region 74 adjacent (e.g., just above) the pit floor 28. The sensor 70 provides the advantage of not requiring any retro-reflective material to outline a perimeter of the pit 26. The sensor 70 provides the reaction signal 60 in response to sensing the presence of the body 50 within the sensed region 74. The reaction signal 60 of the illustrated example is used in the same or similar manner as the reaction signal is used in the safety system 12a discussed above.

Figure 9:
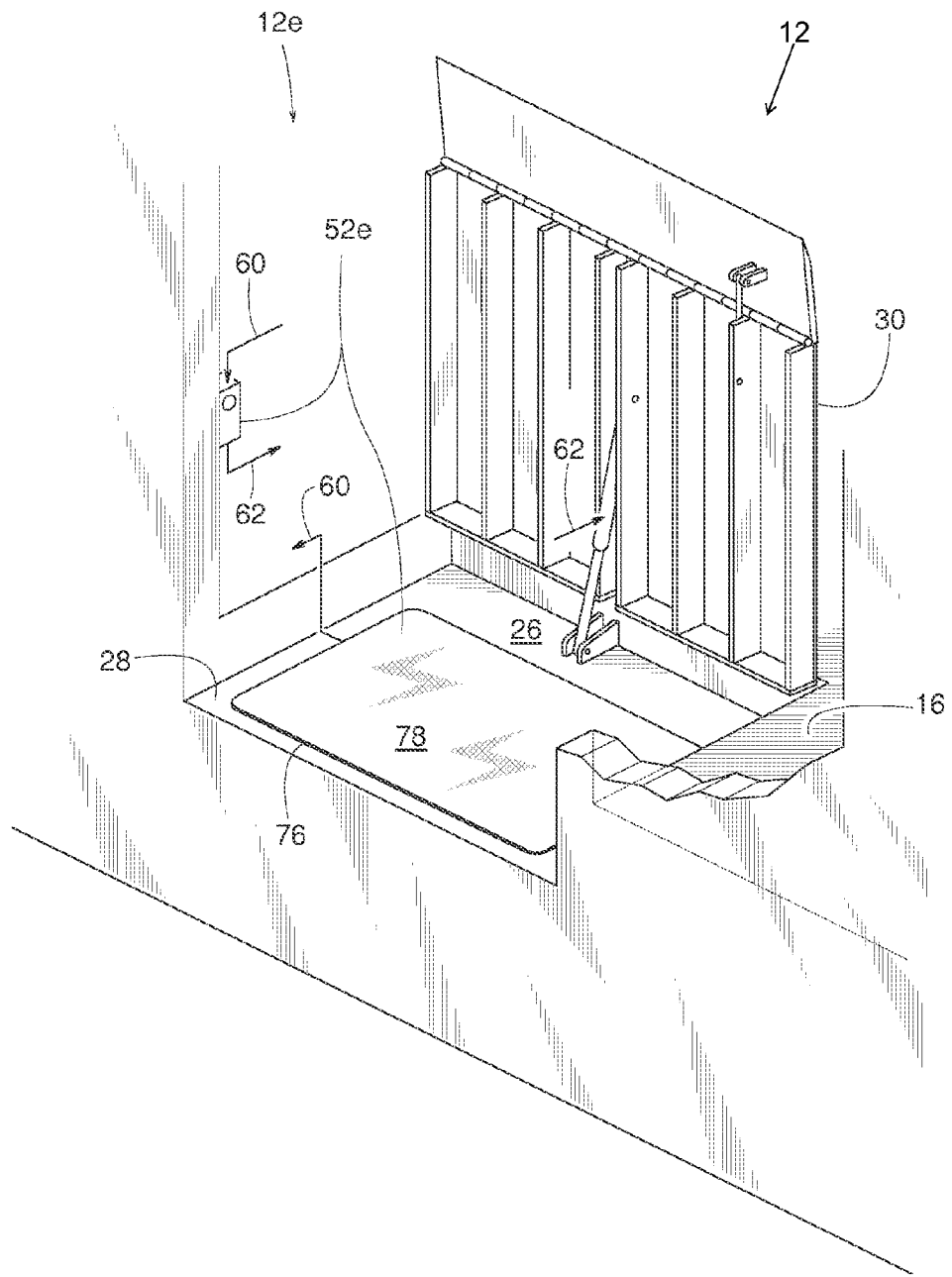
FIG. 9 is a partial cutaway perspective view of another example safety system constructed in accordance with the teachings disclosed herein.

FIG. 9 shows another example safety system 12e disclosed herein for monitoring and/or controlling operation of a vertically storing dock leveler. The example safety system 12e of FIG. 9 has a sensor system 52e that includes a sensor 76 in the form of a pressure sensitive mat positioned on at least a portion of the pit floor 28 that monitor a sensed region 78. The weight of the body 50 on the pressure sensitive mat closes electrical contacts within the sensor 76 to produce the reaction signal 60. The reaction signal 60 of the illustrated example is used in the same or similar manner as the reaction signal is used in the safety system 12a discussed above.

Figure 10:
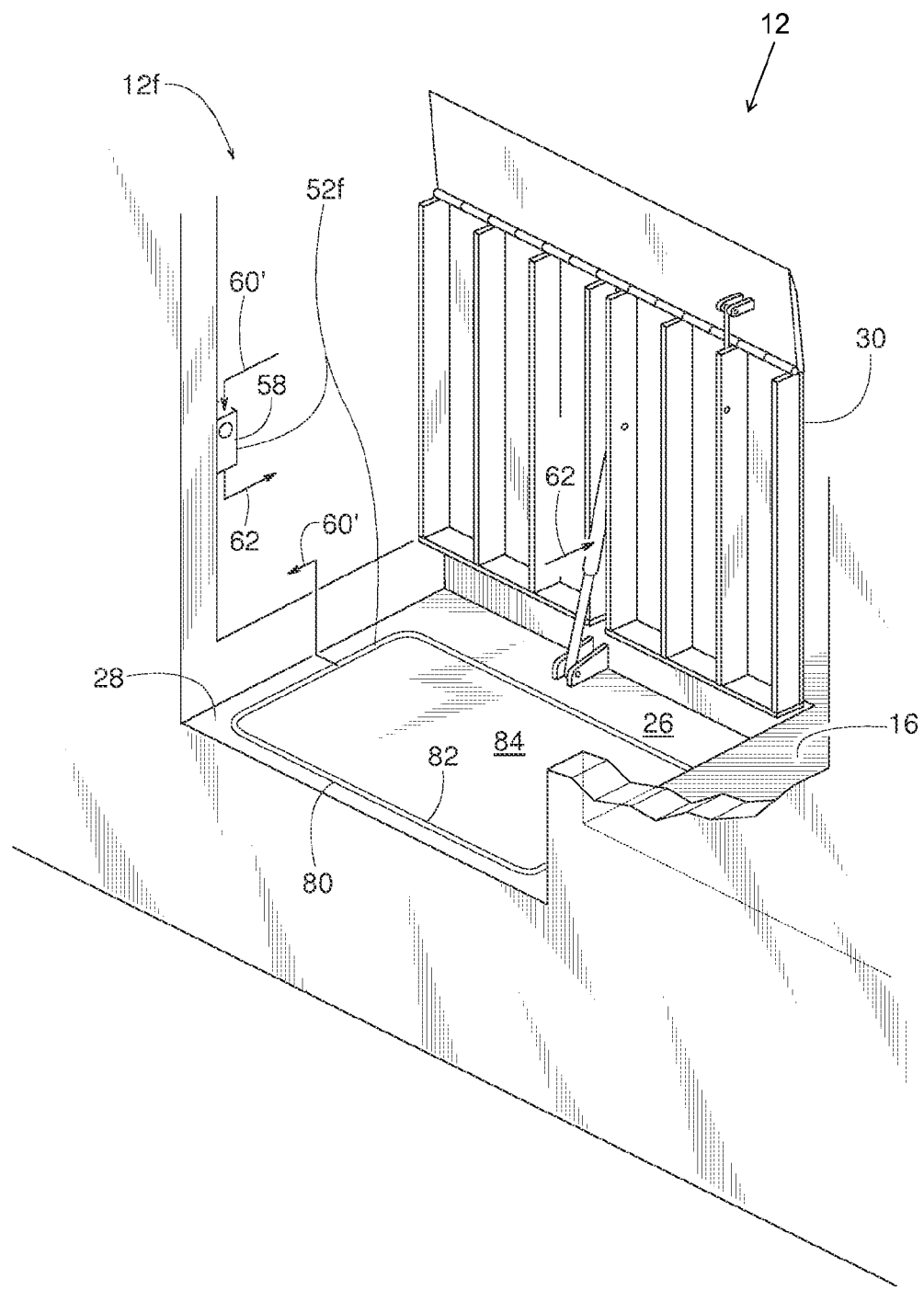
FIG. 10 is a partial cutaway perspective view of another example safety system constructed in accordance with the teachings disclosed herein.

FIG. 10 shows another example safety system 12f disclosed herein for monitoring and/or controlling operation of a vertically storing dock leveler. The example safety system 12f of the illustrated example has a sensor system 52f that includes a sensor 80 in the form of an induction loop or antenna 82 encircling the pit 26 to monitor a sensed region 84 within the pit 26. In some examples, the antenna 82 is embedded within the floor or sidewalls of the pit 26. The antenna 82 carries an oscillating signal of a nominal frequency to generate a magnetic field around the antenna 82. When the body 50 disturbs the magnetic field by altering the capacitive coupling between the antenna 82 and ground, the oscillating signal within the antenna 82 oscillates at a different frequency (e.g., a frequency that is lower) relative to a nominal frequency. A change (e.g., a drop) in frequency can be used to identify that the body 50 is within the sensed region 84. In this example, the reaction signal 60 is the change in oscillating frequency. When the presence of the body 50 disturbs the electromagnetic field around the antenna 82, the controller 58 reacts to a reaction signal 60' in a manner similar or identical to the controller 58 of the example safety system 12a discussed above.

Figure 11:
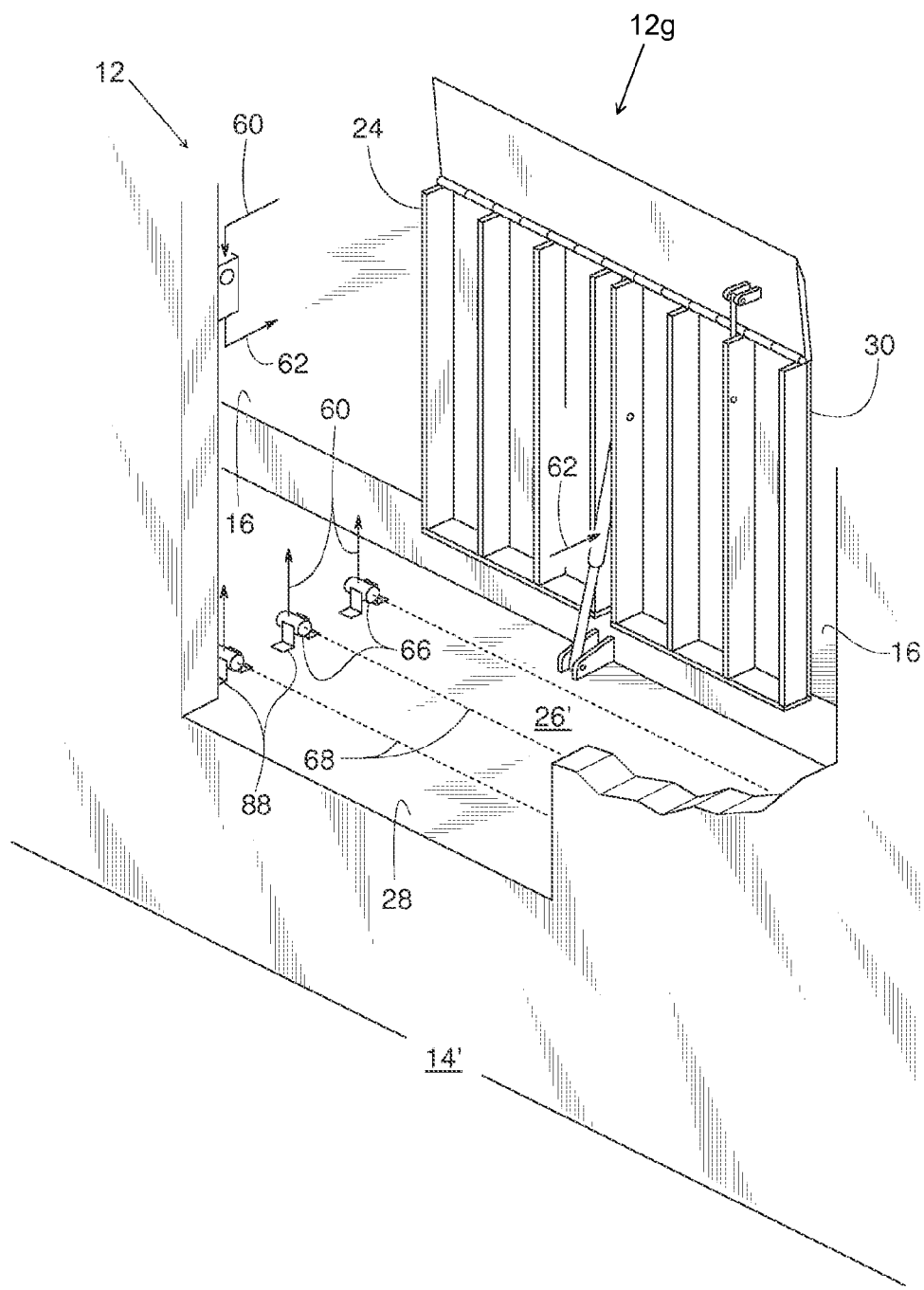
FIG. 11 is a partial cutaway perspective view of another example safety system constructed in accordance with the teachings disclosed herein.
Figure 12:
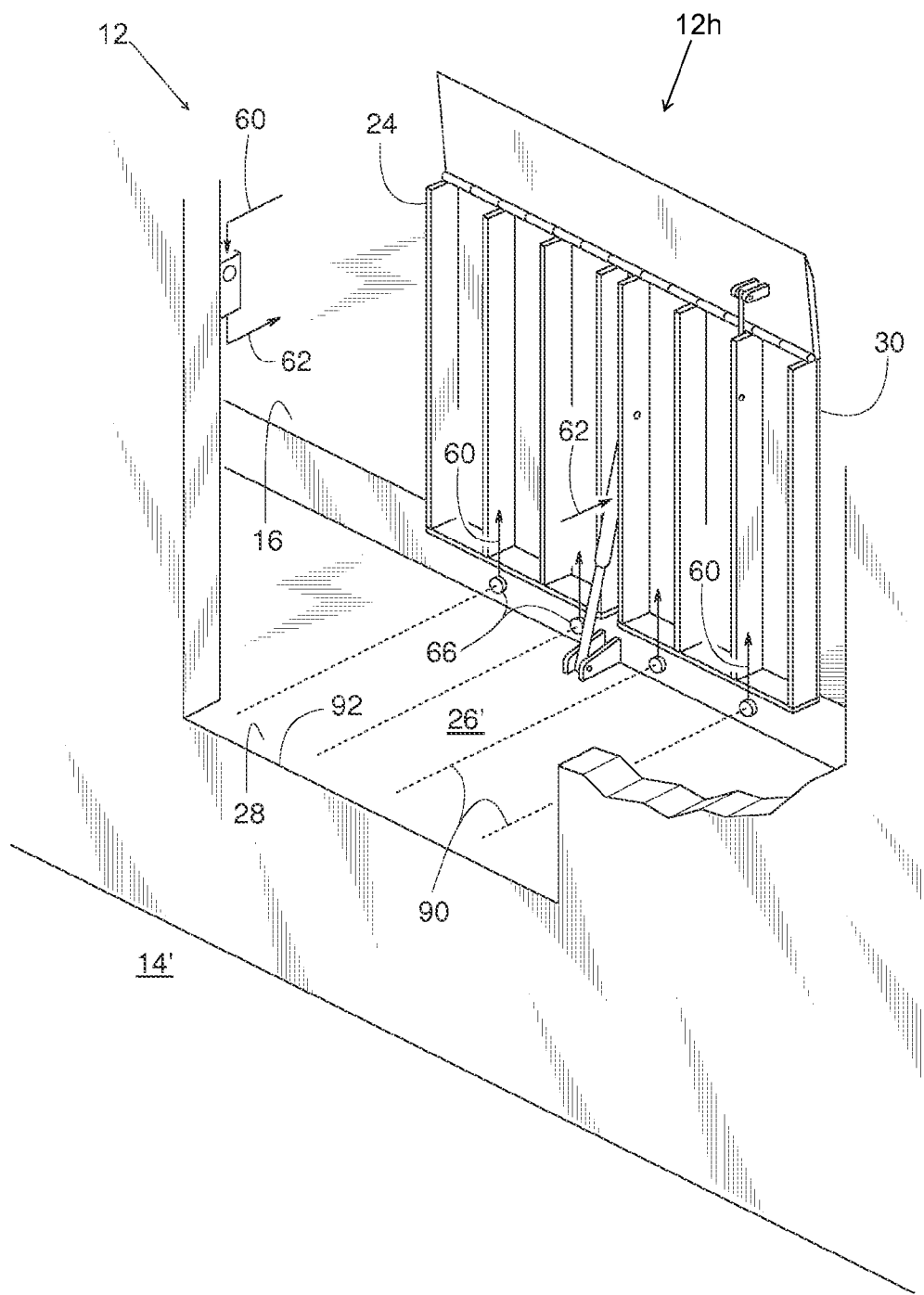
FIG. 12 is a partial cutaway perspective view of another example safety system constructed in accordance with the teachings disclosed herein.
Figure 13:
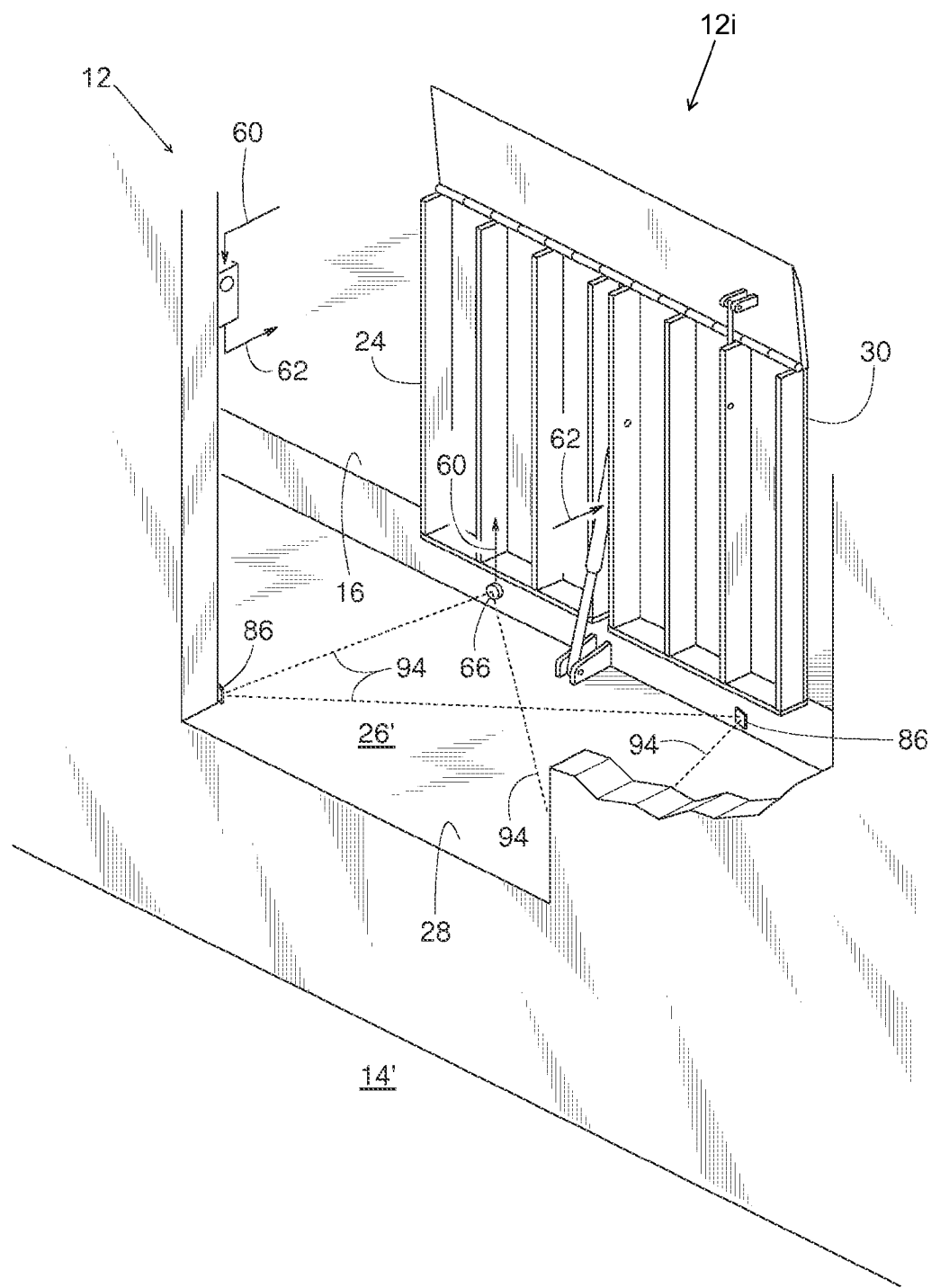
FIG. 13 is a partial cutaway perspective view of another example safety system constructed in accordance with the teachings disclosed herein.

FIGS. 11-13 show an example loading dock 14' having a pit 26' with an extended width so that multiple dock levelers 24 can be installed side-by-side within the same pit 26'. FIGS. 11-13 also show example safety systems 12g, 12h, 12i, respectively, having sensors 66 can be installed in various arrangements to create a large (e.g., an infinite) variety of beam patterns, examples of which include, but are not limited to, a single beam pointed in any direction, a plurality of beams projected in various directions, a plurality of parallel beams projected in a forward direction, a plurality of beams projected in a rearward direction, a plurality of beams projected sideways (e.g., FIGS. 7 and 11), one or more beams projected in a cross-hatched pattern, one or more beams projected in an X-pattern, one or more beams projected in a Z-pattern, and/or various combinations thereof. In some examples, one or more mirrors 86 (e.g., FIG. 13) are used for creating a desired beam pattern.

In the example shown in FIG. 11, brackets 88 are used for mounting the sensors 66 to the pit floor 28 such that the sensors 66 project the beams 68 in a pattern similar to the pattern shown in FIG. 7. FIG. 12 shows the sensor 66 projecting beams 90 in a forward direction relative to the dock wall 18. In some examples of FIG. 12, a series of reflectors or targets are installed along a front edge 92 of the pit 26', and in other examples of FIG. 12, the sensors 66 function without the need for such reflectors or targets. FIG. 13 shows the sensor 66 with a plurality of mirrors 86 for projecting the beam 94 in an X-pattern.

As used herein, the term, "stored upright position," does not necessarily mean that the deck 30 is perfectly vertical in the stored upright position. Rather, as used herein, the stored upright position is a position in which the deck 30 is in a position closer to being vertical than horizontal. The dock platform 16 and the pit floor 28 defining the pit 26 therebetween as used herein means that the dock platform is elevated relative to the pit floor 28. The dock platform 16 and the pit floor 28 defining the pit 26' therebetween as used herein means that the dock platform 16 is an elevated relative to the pit floor 28. In some examples, various structure steel angles, channels, bar stock and/or plates line various edges and surfaces of the pit 26, the pit 26', the dock platform 16, and the pit floor 28. For instance, in some examples, a steel channel is between the rear hinge 42 and the dock platform's upper edge 46. As used herein, a sensor system having a sensed region within a pit means that at least some of the sensed region is within the pit. As used herein, an induction loop (e.g., an antenna) being proximate the pit means that the induction loop is sufficiently close to the pit to detect a body within the pit.

Figure 14:
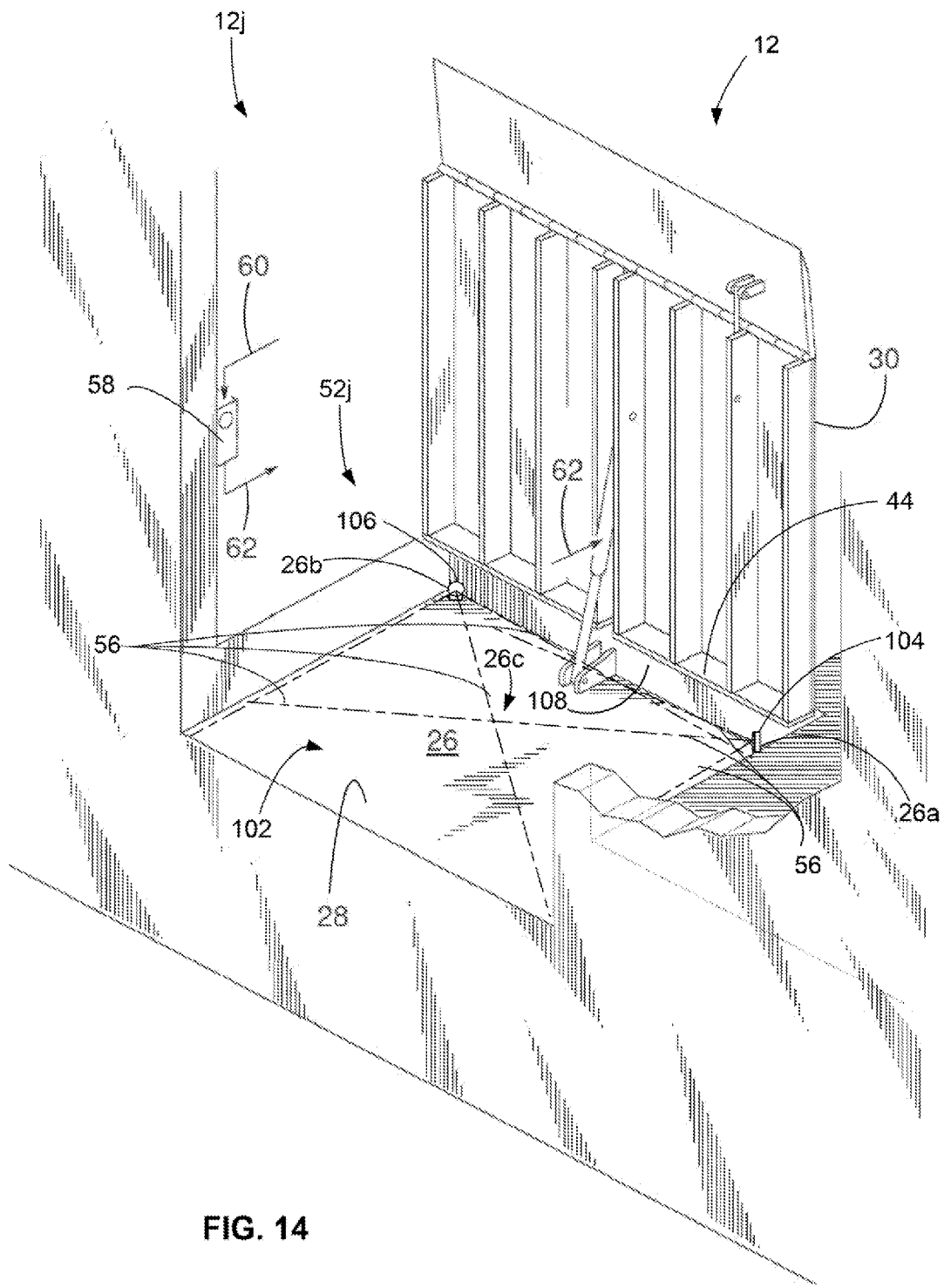
FIG. 14 is a partial cutaway perspective view of another example safety system constructed in accordance with the teachings disclosed herein.

FIG. 14 shows another example safety system 12j disclosed herein for monitoring and/or controlling operation of a vertically storing dock leveler. The example safety system 12j has a sensor system 52j that monitors a sensed area or region 102 to detect a presence of a body (e.g., the body 50) within the sensed region 102. The sensed region 102 of the illustrated example is located in an area of the pit 26 adjacent the pit floor 28. More specifically, the sensor system 52*j* of the illustrated example includes a first sensor 104 and a second sensor 106. The first sensor 104 of the illustrated example is positioned or located adjacent a first rear corner 26*a* of the pit 26 and the second sensor 106 of the illustrated example is positioned or located adjacent a second rear corner 26*b* of the pit 26. The first and second rear corners 26*a* and 26*b* of this example are adjacent the rear edge 44 of the deck 30. In particular, the first and second sensors 104 and 106 of the illustrated example are positioned in the respective first and second rear corners 26*a* and 26*b* such that a first sensed area or region of the first sensor 104 overlaps a second sensed area or region of the second sensor 106.

To enable overlapping sensing areas or regions of the respective first and second sensors 104 and 106, the first sensor 104 and the second sensor 106 of the illustrated example are positioned or directed outwardly from a rear wall 108 of the pit 26 and are angled toward a central or middle portion 26*c* of the pit floor 28. Overlapping the sensing regions of the first and second sensors 104 and 106 as shown in FIG. 14 improves the accuracy of the sensor system 52*j* to detect a body in the pit 26. In the illustrated example, the sensors 104 and 106 and the sensed region 102 remain substantially stationary as deck 30 moves between the stored upright position and the lowered operative position (e.g., a fully lowered position) and remain out of the travel path of the dock 30. In the illustrated example, the first and second sensors 104 and 106 are microwave, motion sensors and only detect motion moving in a direction away from the first and second sensors 104 and 106. In other examples, the first and second sensors 104 and 106 are implemented by photoelectric eyes, proximity sensors, motion detectors for sensing a moving body, and/or body sensors for detecting a stationary body within the pit 26. In operation, the sensors 104 and/or 106 of the illustrated example provide a reaction signal 60 in response to sensing or detecting the presence or movement of a body within the sensed region 102. The sensors 104 and 106 of the illustrated example can detect a body within the pit 26 prior to or during movement of the deck 30 from the upright position toward the lowered operative position (e.g., a fully lowered position). In response to the sensor system 52*j* detecting the presence of a body within the sensed region 102, the sensor system 52*j* provides a reaction signal 60 that the controller 58 receives as an input. Upon receiving the reaction signal 60, the controller 58 provides an output 62 that commands the deck 30 to a state of restricted movement. The reaction signal 60 of this example is used in the same or similar manner as the reaction signal is used in the safety system 12*a* discussed above.

Figure 15:
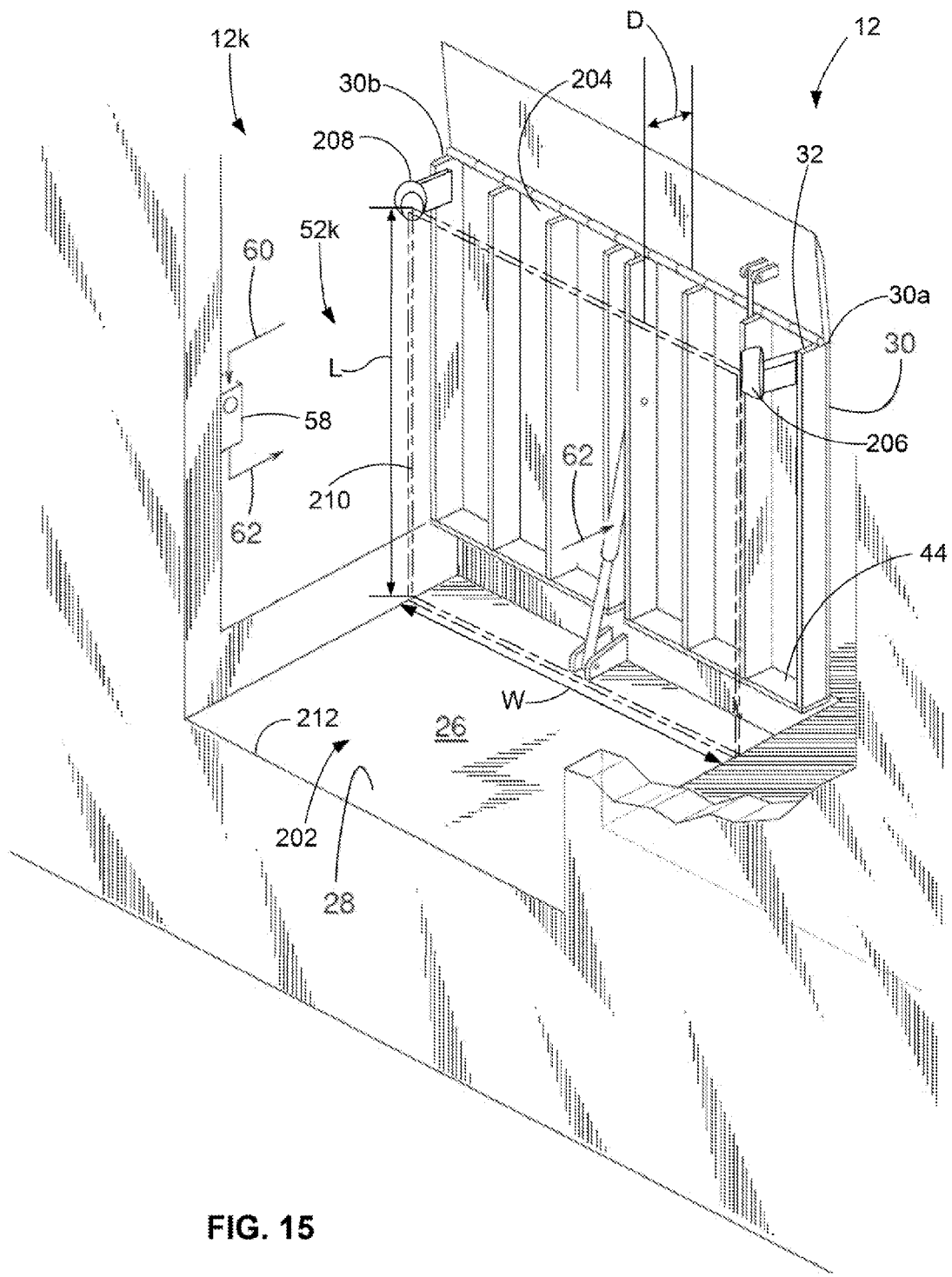
FIG. 15 is a partial cutaway perspective view of another example safety system constructed in accordance with the teachings disclosed herein.

FIG. 15 illustrates another example safety system 12*k* disclosed herein for monitoring and/or controlling operation of a vertically storing dock leveler. The example safety system 12*k* of the illustrated example has a sensor system 52*k* that monitors a sensed area or region 202 to detect a presence of a body (e.g., the body 50) within the sensed region 202. The sensed region 202 of the illustrated example is defined by an area of the pit 26 between a lower surface 204 of the deck 30 and the pit floor 28. More specifically, the sensor system 52*k* of the illustrated example includes a first sensor 206 and a second sensor 208. The first sensor 206 of the illustrated example is positioned or located adjacent a first corner 30*a* of the deck 30. The second sensor 208 of the illustrated example is positioned or located adjacent a second corner 30*b* of the deck 30. In the illustrated example, the first and second corners 30*a* and 30*b* are adjacent the front edge 32 of the deck 30. However, in other examples, one or both of the first sensor 206 or the second sensor 208 are located adjacent a corner defined by the rear edge 44 of the deck 30. The first and second sensors 206 and 208 of the illustrated example may be implemented by photoelectric eyes, proximity sensors, motion detectors for sensing a moving body, and/or body sensors for detecting a stationary body within the pit 26, and/or any other suitable sensor(s).

Referring to the example of FIG. 15, the sensed region 202 of the illustrated example monitored by the first and second sensors 206 and 208 covers an area or plane 210 having a width W (e.g., a distance between the side edges of the deck 30 perpendicular to the front and rear edges 32 and 44) and a length L (e.g., a distance between the front and rear edges 32 and 44). The width W and the length L of the plate 210 of the illustrated example are substantially similar to a width and a length of the deck 30, respectively. As a result, the plane 210 of the sensed region 202 has a rectangular shape or profile that is substantially similar to the shape or profile of the deck 30 (e.g., a width and length of the deck 30). As shown in FIG. 15, the first and second sensors 206 and 208 of the illustrated example monitor the sensed region 202 at a distance D that is offset from the lower surface 204 of the deck 30. To offset the sensed region 202 relative to the lower surface 204 of the deck 30, the sensors 206 and 208 of the illustrated example are positioned a distance (e.g., via brackets) approximately between 6 to 12 inches from the lower surface 204 of the deck 30.

In the illustrated example of FIG. 15, the sensors 204 and 206 and, thus, the sensed region 202 moves as the deck 30 moves between the stored upright position and the lowered operative position (e.g., a fully lowered position). Thus, the sensed region 202 of the illustrated example is defined across approximately the width W and the length L of the deck 30 as the deck 30 moves between the upright and lowered positions. In operation, for example, if a body within the pit 26 that breaks or crosses the plane 210 monitored by the sensors 206 and 208 (or conversely, if the deck 30 is moving, if the plane moves into overlapping engagement with a body), a reaction signal 60 is sent to the controller 58 as an input. Upon receiving the reaction signal 60, the controller 58 provides an output 62 that commands the deck 30 to enter a state of restricted movement. For example, the reaction signal 60 is used in the same or similar manner as the reaction signal is used in the safety system 12*a* discussed above to stop movement and/or control movement of the deck 30. The sensing system 52*k* of the illustrated example can detect the presence or movement of a body within the pit 26 prior to or during movement of the deck 30 from the upright position to the lowered position.

Figure 16:
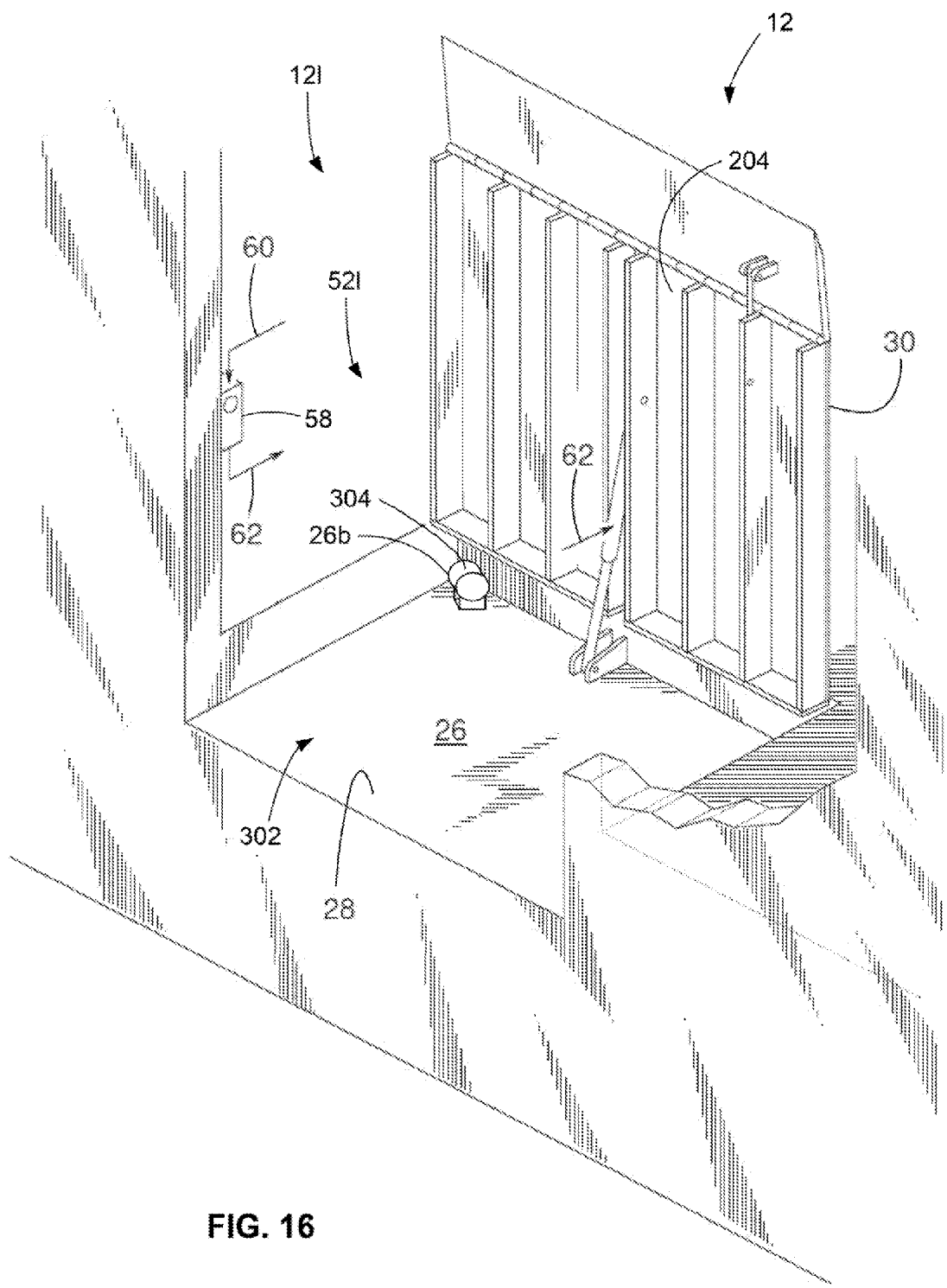
FIG. 16 is a partial cutaway perspective view of another example safety system constructed in accordance with the teachings disclosed herein.

FIG. 16 shows another example safety system 12*l* disclosed herein for monitoring and/or controlling a vertically storing dock leveler. The safety system 12*l* of this example has a sensor system 52*l* that monitors a sensed area or region 302 adjacent the pit floor 28 to detect a presence of a body (e.g., the body 50) within the sensed region 302. The sensor system 52*l* of the illustrated example includes a camera 304 (e.g., a digital video camera). In the illustrated example, the camera 304 is positioned adjacent a rear corner 26*b* of the pit floor 28. However, in other examples, the camera 304 may be positioned or attached to the lower surface 204 of the deck 30. For example, the camera 304 may be positioned or attached to the deck 30 in place of the sensor 54 shown in FIG. 1.

Figure 17:
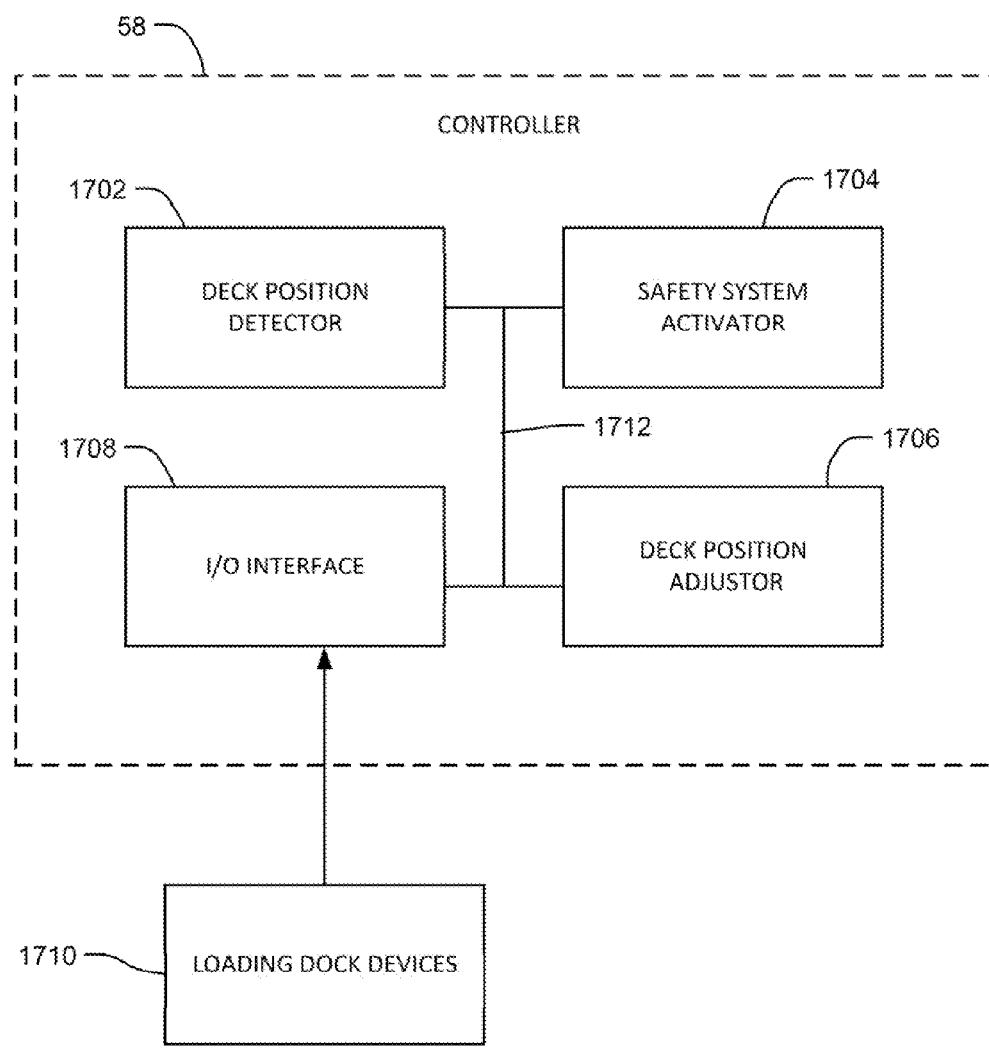
FIG. 17 is a block diagram representative of an example implementation of the example controller of FIGS. 1-16.

FIG. 17 is a block diagram of an example implementation of the example controller 58 of FIGS. 1-16. In the illustrated example, the controller 58 includes a deck position detector 1702, a safety system activator 1704, a deck position adjustor 1706, and an input/output interface 1708. The deck position detector 1702, the safety system activator 1704, the deck position detector 1706 and the input/output interface 1708 of the illustrated example are in communication via a communication bus 1712. The input/output interface 1708 of the illustrated example communicatively couples the example controller 58 to one or more loading dock devices 1710 such as, for example, one or more of the example sensors 54, 66, 70, 76, 80, 104, 106, 206, 208, the example camera 304 (FIG. 16), the example lip actuator 40, the example deck actuator 48, a sensor to detect a position (e.g., the upright position or the lowered operative position) of the deck 30, and/or any other device that may be used in conjunction with the example loading dock leveler 24 of FIGS. 1-16.

Based on the signal received via the input/output interface 1708, the deck position detector 1702 of the illustrated example determines a state or position of one or more of the loading dock devices 1710 such as, for example, the position of the deck 30. In some examples, the deck position detector 1702 determines if the deck actuator 48 is in an extended state (e.g., which may correlate to the example deck 30 being in the upright position) or a retracted state (e.g., which may correlate to the example deck 30 being in one of the lowered positions of FIG. 4 or 5). For example, the deck position detector 1702 of the illustrated example receives a signal from a sensor coupled to the example deck actuator 48 and/or the deck 30 via the input/output interface 1708 that is indicative of the position of the example deck 30.

The deck position detector 1702 of the illustrated example communicates the position of the example deck 30 to the safety system activator 1704 and/or the deck position adjustor 1706. In turn, for example, the safety system activator 1704 of the illustrated example activates or deactivates the example safety systems 12 of FIGS. 1-16 based on the position of the example deck 30 detected by the deck position detector 1702. For example, when the deck position detector 1702 determines that the example deck 30 is in the upright position, the safety system activator 1704 of the illustrated example actives the example safety system 12 of FIGS. 1-16.

In some examples, the safety system activator 1704 receives and/or analyzes signals (e.g., the reaction signal 60) provided by the example sensors 54, 66, 70, 76 80, 104, 106, 204, 206 and/or the camera 304 to determine or detect the presence and/or absence of the body 50 in the example sensed region 56, 68', 74, 78, 84, 102, 202 of the example pit 26, 26'. For example, the safety system activator 1704 of the illustrated example analyzes the example reaction signal 60 and commands the deck position adjustor 1706 to adjust the position of the example deck 30 based on the detected reaction signal 60. For example, in response to the example safety system activator 1704 receiving the reaction signal 60, the deck position adjustor 1706 of the illustrated example causes the example deck actuator 48 to move to an extended position (e.g., to move the example deck 30 toward the upright position). In some examples, the deck position adjustor 1706 of the illustrated example holds the position of the deck 30 in response to the example safety system activator 1704 receiving the example reaction signal 60.

While an example manner of implementing the controller 58 of FIGS. 1-16 is illustrated in FIG. 17, one or more of the elements, processes and/or devices illustrated in FIG. 17 may be combined, divided, re-arranged, omitted, eliminated and/or implemented in any other way. Further, the example deck position detector 1702, the example safety system activator 1704, the example deck position adjustor 1706 and/or, more generally, the example controller 58 of FIG. 17 may be implemented by hardware, software, firmware and/or any combination of hardware, software and/or firmware. Thus, for example, any of the example the example deck position detector 1702, the example safety system activator 1704, the example deck position adjustor 1706 and/or, more generally, the example controller 58 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example deck position detector 1702, the example safety system activator 1704 and the example deck position adjustor 1706 are hereby expressly defined to include a tangible computer readable storage device or storage disk such as a memory, a digital versatile disk (DVD), a compact disk (CD), a Blu-ray disk, etc. storing the software and/or firmware. Further still, the example controller 58 may include one or more elements, processes and/or devices in addition to, or instead of, those illustrated in FIG. 17, and/or may include more than one of any or all of the illustrated elements, processes and devices.

Figure 18:
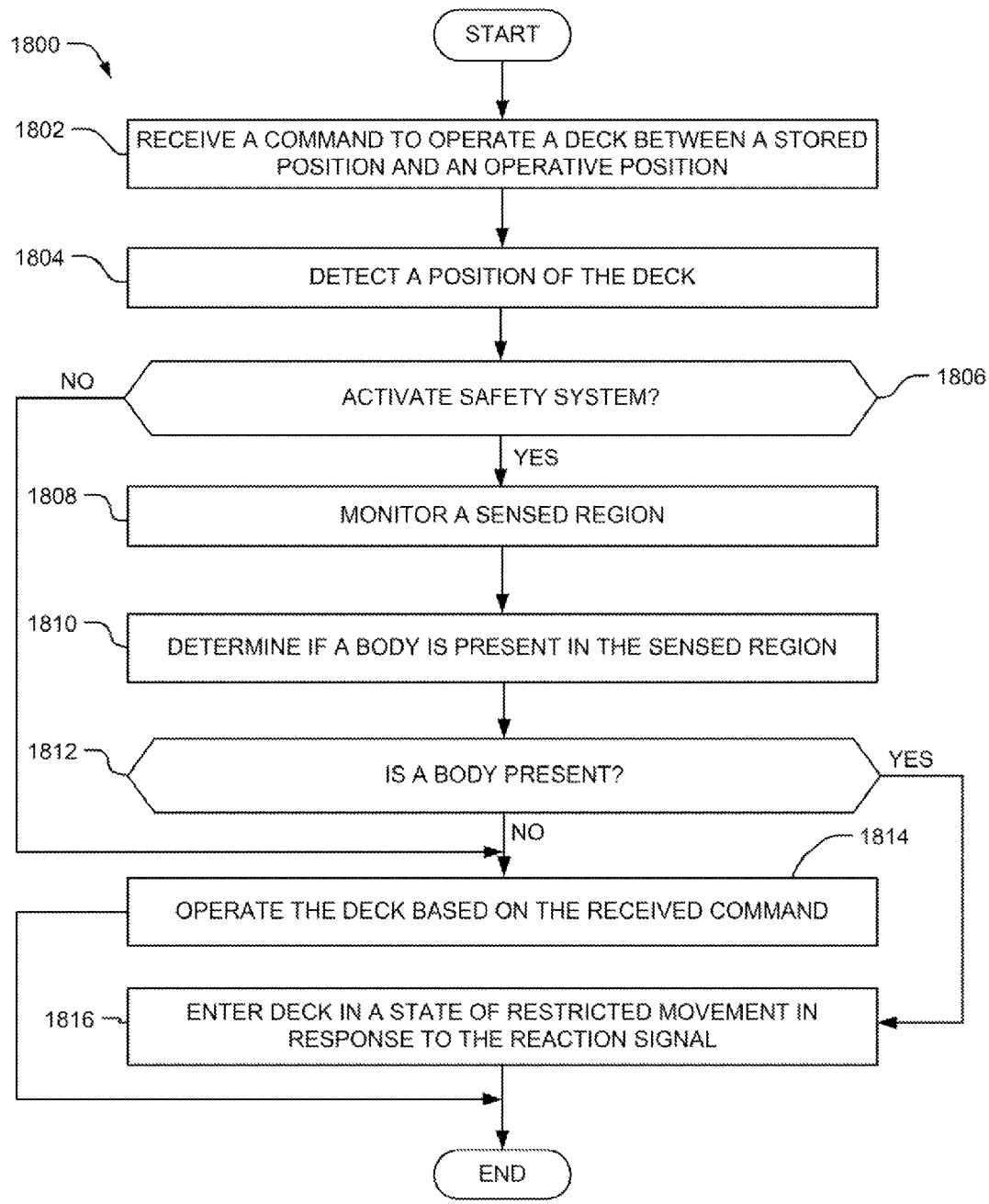
FIG. 18 is a flowchart representative of example machine readable instructions which may be executed to implement the example controller of FIG. 17.

A flowchart representative of example machine readable instructions for implementing the example controller 58 of FIG. 17 is shown in FIG. 18. In this example, the machine readable instructions comprise a program for execution by a processor such as the processor 2012 shown in the example processor platform 2000 discussed below in connection with FIG. 20. The program may be embodied in software stored on a tangible computer readable storage medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example program is described with reference to the flowchart illustrated in FIG. 18, many other methods of implementing the example controller 58 may alternatively be used. For example, the order of execution of the blocks may be changed, and/or some of the blocks described may be changed, eliminated, or combined.

As mentioned above, the example processes of FIG. 18 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 18 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The program 1800 of FIG. 18 begins at block 1802 when the deck position adjustor 1706 of the illustrated example receives a command to operate the example deck 30 between the upright position and the lowered position. Prior to the deck position adjustor 1706 moving the deck 30 based on the received command, the deck position detector 1702 of the illustrated example detects a position (e.g., a current position) of the example deck 30 (block 1804). Specifically, the deck position detector 1702 of the illustrated example detects whether the example deck 30 is in an upright position or a lowered position to determine if the example safety system 12 (e.g., the safety systems 12*a*-12*l*) should be activated (block 1806). For example, if the deck position detector 1702 of the illustrated example determines that the example deck 30 is in a lowered or operative position, the deck position detector 1702 communicates the position of the example deck 30 to the safety system activator 1704. The safety system activator 1704, for example, deactivates or disables the example safety system 12 of the example dock leveler 24 and/or ignores a signal (e.g., the example reaction signal 60) provided by the sensors 54, 66, 70, 76, 80, 104, 106, 206, 208 of the example safety system 12 when the example deck position detector 1702 detects that the deck 30 is in a lowered or operative position. If the safety system activator 1704 of the illustrated example determines that the example safety system 12 is to be deactivated, the deck position adjustor 1706 of the illustrated example operates the deck 30 based on the received command from block 1802 (block 1814).

If the deck position detector 1702 of the illustrated example detects that the example deck 30 is in the upright position, the deck position detector 1702 communicates the position of the example deck 30 to the safety system activator 1704, which activates the example safety system 12 of FIGS. 1-16 (block 1806).

When the safety system activator 1704 of the illustrated example activates the example safety system 12 (block 1806), the safety system activator 1704 monitors the example sensed region 56, 68', 74, 78, 84, 102, 202 of the example safety system 12 (block 1808). For example, the safety system activator 1704 of the illustrated example receives signals from the example sensors 54, 66, 70, 76, 80 and 104, 106, 206, 208 when monitoring the sensed region 56, 68', 74, 78, 84, 102, 202 of the example pit 26, 26'.

The safety system activator 1704 of the illustrated example determines if a body 50 is present in the example sensed region 56, 68', 74, 78, 84, 102, 202 (block 1810). If the safety system activator 1704 of the illustrated example determines that a body 50 is not present within the example sensed region 56, 68', 74, 78, 84, 102, 202 then the example safety system activator 1704 commands the deck position adjustor 1706 to operate (and/or continues operating) the deck 30 based on the command received in block 1802 (block 1814).

If the safety system activator 1704 of the illustrated example determines that a body 50 is present within the sensed region 56, 68', 74, 78, 84, 102, 202 then the safety system activator 1704 commands the deck position adjustor 1706 to enter a state of restricted movement (block 1816). For example, the deck position adjustor 1706 of the illustrated example stops the operation and/or holds a position of the example deck 30 at a position at which the example safety system activator 1704 received or processed the example reaction signal 60. In some examples, the deck position adjustor 1706 of the illustrated example causes the deck actuator 48 to extend to move the example deck 30 toward the upright position upon entry into the state of restricted movement.

Figure 19:
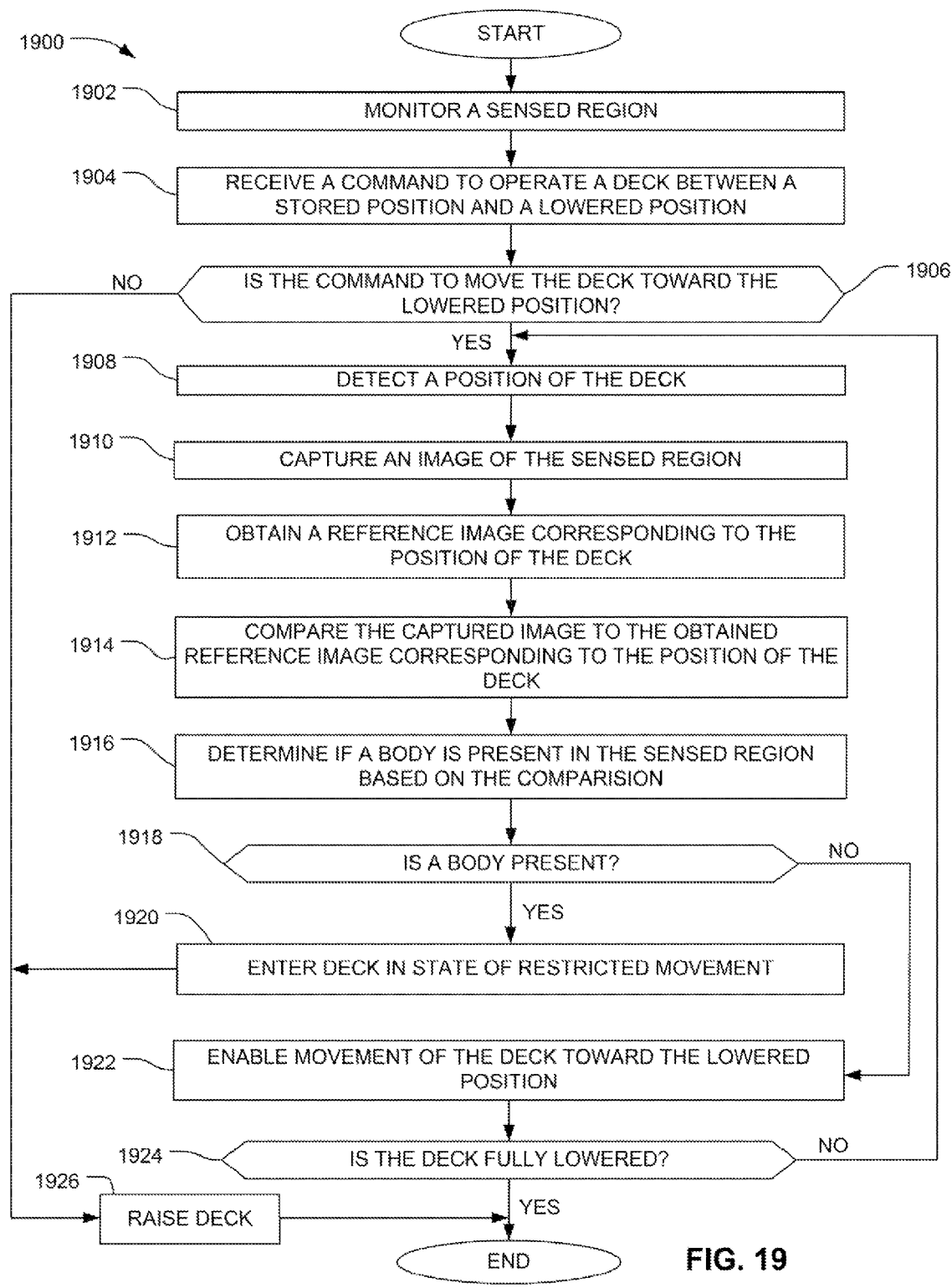
FIG. 19 is a flowchart representative of example machine readable instructions which may be executed to implement the example controller of FIG. 17 and the example safety system of FIG. 16.

FIG. 19 is a flowchart representative of example machine readable instructions for implementing the example controller 58 of FIG. 17 and the example safety system 12*l* of FIG. 16. In the illustrated example, the machine readable instructions comprise a program for execution by a processor such as the processor 2012 shown in the example processor platform 2000 discussed in connection with FIG. 20. The program may be embodied in software stored on a tangible computer readable storage medium such as a CD-ROM, a floppy disk, a hard drive, a digital versatile disk (DVD), a Blu-ray disk, or a memory associated with the processor 2012, but the entire program and/or parts thereof could alternatively be executed by a device other than the processor 2012 and/or embodied in firmware or dedicated hardware. Further, although the example program is described with reference to the flowchart illustrated in FIG. 19, many other methods of implementing the example controller 58 may alternatively be used. For example, the order of execution of the blocks may be changed, and/or some of the blocks described may be changed, eliminated, or combined.

The example processes of FIG. 19 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals. As used herein, "tangible computer readable storage medium" and "tangible machine readable storage medium" are used interchangeably. Additionally or alternatively, the example processes of FIG. 19 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable device or disk and to exclude propagating signals. As used herein, when the phrase "at least" is used as the transition term in a preamble of a claim, it is open-ended in the same manner as the term "comprising" is open ended.

The example program 1900 of FIG. 19 begins at block 1902 when the safety system activator 1704 monitors the sensed region 302 of FIG. 16. In the illustrated example, the safety sensor activator 1704 continuously monitors the sensed region 302 (e.g., both prior to and after) the deck position adjustor 1706 receives a command to move the deck 30 toward the lowered position (e.g., a fully lowered position). However, in other examples, the safety system activator 1704 may be turned on and off (e.g., activated when the deck position adjustor 1706 receives a command to move the deck 30).

When the deck position adjustor 1706 of the illustrated example receives a command to operate the example deck 30 between the upright position and the lowered position (block 1904), the deck position adjustor 1706 determines if the command received is to cause the deck 30 to move in a direction toward the stored position (e.g., the upright position) or the operative position (e.g., the lowered position) (block 1906). For example, the deck position adjustor 1706 causes the deck actuator 48 to extend to move the deck 30 in a direction toward the stored position and the deck position adjustor 1706 causes the deck actuator 48 to retract to move the deck 30 in a direction toward the lowered position.

If the deck position adjustor 1706 determines that the command is not to move the deck 30 in a direction toward the lowered position at block 1906, then the deck position adjustor 1706 causes the deck to raise to the stored, upright position (block 1926).

In some examples, if the deck position adjustor 1706 determines that the command is to move the deck 30 in a direction toward the lowered operative position at block 1906, the deck position detector 1702 detects a position of the deck 30 (block 1908). For example, the deck position detector 1702 detects the position of the deck 30 relative to the fully lowered position or the stored position. For example, the deck position detector 1702 of the illustrated example receives a signal from a sensor coupled to the example deck actuator 48 and/or the deck 30 via the input/output interface 1708 that is indicative of the position of the example deck 30. In some examples, the deck position detector 1702 monitors a parameter, for example a voltage or current in a motor, to detect when the fully lowered or fully raised positions of the deck 30 is obtained. The deck position detector 1702 of the illustrated example communicates the position of the example deck 30 to the safety system activator 1704.

The example safety system activator 1704 captures an image (e.g., a digital image) of the sensed region of the pit 26 (block 1910). For example, the safety system activator 1704 receives the image of the sensed region that is captured by the camera 304 (e.g., the camera 304 of FIG. 16) via the I/O interface 1708. The captured image provided by the camera 304 is associated with the position of the deck 30 detected by the deck position detector 1702.

The safety system activator 1704 then obtains a reference image of the sensed region corresponding to the position of deck 30 (block 1912). For example, the safety system activator 1704 retrieves or obtains the reference image(s) from a look-up table stored in the memory 2016 and/or a database accessible via the network 2026. For example, if the deck 30 is in the stored position, the safety system activator 1704 obtains a reference image of the sensed region 302 associated with the deck 30 being in the stored upright position (e.g., the position shown in FIG. 16). In some examples, however, the captured image is not associated with a position of the deck and/or the position of the deck is not obtained. Instead, the captured image is compared to a reference image and/or a plurality of reference images (e.g., all images representative of the pit 26 and/or the pit 26' when the deck 30 is at and/or between the fully stored position and/or the fully lowered position).

The safety system activator 1704 then compares the captured image to the obtained reference image (block 1914). Based on the comparison between the captured image and the obtained reference image at block 1914, the safety system activator 1704 of the illustrated example determines if a body (e.g., the body 50) is present in the sensed region 302 (block 1916). For example, the referenced image may be an image representative of an image of the pit 26 including components of the deck 30 (e.g., the deck actuator 48, hoses, other devices needed to operate the deck 30) when the deck 30 is in the stored position and/or a plurality of deck positions between the stored position and the fully lowered position. For example, the safety system activator 1704 determines if the captured image matches the reference image. If the captured image includes a body not present in the representative image, then the safety system activator 1704 determines that a body is present in the sensed region 302. If the captured image is substantially similar or identical to the representative image, then the safety system activator 1704 determines that a body is not present in the sensed region 302.

If the safety system activator 1704 determines that a body is present within the sensed region at block 1918, the safety system activator 1704 commands the deck position adjustor 1706 to enter into a state of restricted movement (block 1920). For example, the deck position adjustor 1706 of the illustrated example stops the operation and/or holds a position of the example deck 30 at a position at which the example safety system activator 1704 received or processed the example reaction signal 60 from the camera 304. In some examples, the deck position adjustor 1706 of the illustrated example causes the deck actuator 48 to extend to move the example deck 30 toward the stored position upon entry into the state of restricted movement.

In the illustrated example, if the deck position adjustor 1706 enters the deck 30 in a stated of restricted movement at block 1920, the deck position adjustor 1706 causes the deck 30 to raise (block 1926) (e.g., to move to the fully stored position). In some examples, if the deck position adjustor 1706 enters the deck 30 in a stated of restricted movement at block 1920, then the deck position adjustor 1706 stops movement of the deck 30 toward the lowered position (e.g., stops the deck 30 in the position when the restricted state is entered at block 1920). In some such examples, the program 1900 ends and a new command is needed to operate the deck 30.

Alternatively, if the safety system activator 1704 determines that a body is present in the sensed region 302 at block 1918 and the deck position adjustor 1706 enters the deck 30 in a stated of restricted movement as indicated at block 1920, the program 1900 loops through blocks 1910, 1912, 1914, 1916 and 1918 until a body is no longer present in the sensed region 302. Thus, after block 1920, in some examples, the safety system activator 1704 continues to receive an updated image of the sensed region 302 captured by the camera 304 at block 1910, compares the updated received image to the obtained reference image at block 1914, and commands the deck position adjustor 1706 to move the deck 30 toward the lowered position at block 1922 when the comparison between the updated image and the reference image is indicative of a body no longer being present within the sensed region 302.

Returning to the illustrated example of FIG. 19, if the safety system activator 1704 of the illustrated example determines that a body 50 is not present within the sensed region 302 at block 1918, then the example safety system activator 1704 commands the deck position adjustor 1706 to enable movement of the deck 30 toward the lowered position (block 1922).

The deck position detector 1702 then determines if the deck 30 is in the fully lowered position (e.g., the position shown in FIG. 5) when the movement of the deck 30 toward the lowered position is enabled at block 1922 (block 1924). If the deck position detector 1702 determines that the deck 30 is not in the fully lowered position, the control returns to block 1908 to continue to monitor for obstructions. If the deck position detector 1702 detects the deck 30 is in the fully lowered position at block 1924, then the program 1900 ends.

Figure 20:
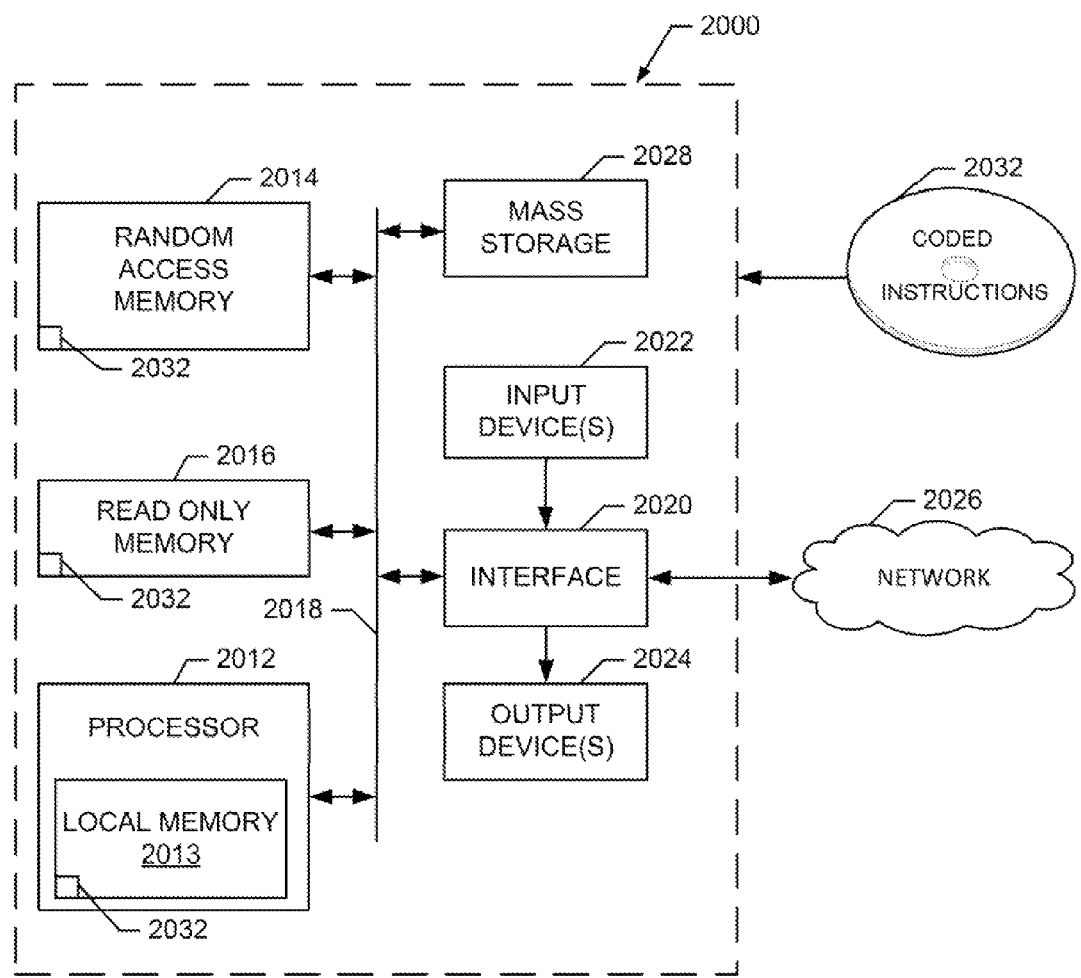
FIG. 20 is a block diagram of an example processor platform capable of executing the instructions of FIG. 18 to implement the example controller of FIG. 17 and/or to execute the instructions of FIG. 19 to implement the example controller of FIG. 17.

FIG. 20 is a block diagram of an example processor platform 2000 capable of executing the instructions of FIG. 18 to implement the apparatus or controller 58 of FIG. 14 and the safety systems 12a-12k and/or the instructions of FIG. 19 to implement the apparatus or controller 58 of FIG. 18 and the safety system 12l of FIG. 16. The processor platform 2000 can be, for example, a server, a personal computer, a mobile device (e.g., a cell phone, a smart phone, a tablet such as an iPad™), a personal digital assistant (PDA), an Internet appliance, or any other type of computing device.

The processor platform 2000 of the illustrated example includes a processor 2012. The processor 2012 of the illustrated example is hardware. For example, the processor 2012 can be implemented by one or more integrated circuits, logic circuits, microprocessors or controllers from any desired family or manufacturer.

The processor 2012 of the illustrated example includes a local memory 2013 (e.g., a cache). The processor 2012 of the illustrated example is in communication with a main memory including a volatile memory 2014 and a non-volatile memory 2016 via a bus 2018. The volatile memory 2014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 2016 may be implemented by flash memory and/or any other desired type of memory device. Access to the main memory 2014, 2016 is controlled by a memory controller.

The processor platform 2000 of the illustrated example also includes an interface circuit 2020. The interface circuit 2020 may be implemented by any type of interface standard, such as an Ethernet interface, a universal serial bus (USB), and/or a PCI express interface.

In the illustrated example, one or more input devices 2022 are connected to the interface circuit 2020. The input device(s) 2022 permit(s) a user to enter data and commands into the processor 2012. The input device(s) can be implemented by, for example, an audio sensor, a microphone, a camera (still or video), a keyboard, a button, a mouse, a touchscreen, a trackpad, a trackball, isopoint and/or a voice recognition system.

One or more output devices 2024 are also connected to the interface circuit 2020 of the illustrated example. The output devices 2024 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 2020 of the illustrated example, thus, typically includes a graphics driver card, a graphics driver chip or a graphics driver processor.

The interface circuit 2020 of the illustrated example also includes a communication device such as a transmitter, a receiver, a transceiver, a modem and/or network interface card to facilitate exchange of data with external machines (e.g., computing devices of any kind) via a network 2026 (e.g., an Ethernet connection, a digital subscriber line (DSL), a telephone line, coaxial cable, a cellular telephone system, etc.).

The processor platform 2000 of the illustrated example also includes one or more mass storage devices 2028 for storing software and/or data. Examples of such mass storage devices 2028 include floppy disk drives, hard drive disks, compact disk drives, Blu-ray disk drives, RAID systems, and digital versatile disk (DVD) drives.

The coded instructions 2032 of FIGS. 18 and/or 19 may be stored in the mass storage device 2028, in the volatile memory 2014, in the non-volatile memory 2016, and/or on a removable tangible computer readable storage medium such as a CD or DVD.

Although certain example methods, apparatus and articles of manufacture have been described herein, the scope of the coverage of this patent is not limited thereto. On the contrary, this patent covers all methods, apparatus and articles of manufacture fairly falling within the scope of the appended claims either literally or under the doctrine of equivalents.

The invention claimed is:

1. A method for monitoring a sensed region of a pit floor of a dock leveler, the method comprising:
positioning a first sensor adjacent a first rear corner of the pit floor and a second sensor adjacent a second rear corner of the pit floor;
receiving a command to move a deck of the dock leveler from a stored upright position toward a range of operative positions;
monitoring the sensed region of the pit floor via the first sensor and the second sensor, where the first sensor is positioned relative to the second sensor such that at least a portion of a first sensing area monitored by the first sensor overlaps at least a portion of a second sensing area monitored by the second sensor, wherein monitoring the sensed region includes only detecting movement of a body in a direction away from at least one of first sensor or the second sensor; and
preventing the deck from moving toward the range of operative positions in response to detecting the body in the sensed region when the deck is in the stored upright position.

2. The method of claim 1, further comprising monitoring the sensed region prior to moving the deck within the range of operative positions.

3. The method of claim 1, further comprising directing each of the first and second sensors outwardly from a dock wall of the dock leveler and angled toward a middle portion of the pit floor.

4. The method of claim 1, wherein monitoring the sensed region comprises monitoring an area that is substantially similar to a width and a length of the deck.

5. The method of claim 1, further comprising disregarding a reaction signal provided by at least one of the first sensor or the second sensor when the deck is moving in the range of operative positions.

6. The method of claim 1, further comprising monitoring the sensed region prior to moving the deck toward the range of operative positions.

7. The method of claim 1, further comprising disregarding a reaction signal provided by at least one of the first sensor or the second sensor when the deck is moving in the range of operative positions to prevent false signals triggered by the at least one of the first sensor or the second sensor from interfering with the operation of the deck when the deck is moving in the range of operative positions.

8. A method for monitoring a sensed region of a pit floor of a dock leveler, the method comprising:
receiving a command to move a deck of the dock leveler from a stored upright position toward a range of operative positions;
monitoring the sensed region of the pit floor via at least one of a first sensor located in the pit floor or a second sensor located in the pit floor, where the first sensor is positioned relative to the second sensor such that at least a portion of a first sensing area monitored by the first sensor overlaps at least a portion of a second sensing area monitored by the second sensor, wherein monitoring the sensed region comprises only detecting movement of a body in a direction away from the least one of the first sensor or the second sensor; and preventing the deck from moving toward the range of operative positions in response to detecting the body in the sensed region when the deck is in the stored upright position.

9. The method of claim 8, further comprising monitoring the sensed region prior to moving the deck within the range of operative positions.

10. The method of claim 8, wherein monitoring the sensed region comprises monitoring an area that is substantially similar to a width and a length of the deck.

11. The method of claim 8, further comprising disregarding a reaction signal provided by at least one of the first sensor or the second sensor when the deck is moving in the range of operative positions.

12. The method of claim 8, further comprising positioning the first sensor adjacent a first rear corner of the pit floor and the second sensor adjacent a second rear corner of the pit floor.

13. The method of claim 8, further comprising directing each of the first and second sensors outwardly from a dock wall of the dock leveler and angled toward a middle portion of the pit floor.

14. The method of claim 8, further comprising disregarding a reaction signal provided by at least one of the first sensor or the second sensor when the deck is moving in the range of operative positions to prevent false signals triggered by the at least one of the first sensor or the second sensor from interfering with the operation of the deck when the deck is moving in the range of operative positions.

* * * * *